US005708762A

United States Patent [19]

Chiba et al.

[11] Patent Number: 5,708,762

[45] Date of Patent: Jan. 13, 1998

[54] PRINT CONTROLLING METHOD AND PRINTER DEVICE

[75] Inventors: Hirotaka Chiba; Masayoshi Shimizu; Tsugio Noda; Masahiro Mori, all of Kawasaki, Japan

[73] Assignee: Fujitsu Limited, Kawasaki, Japan

[21] Appl. No.: 544,983

[22] Filed: Oct. 30, 1995

[30] Foreign Application Priority Data

Mar. 7, 1995 [JP] Japan .................................. 7-047319

[51] Int. Cl.[6] .................................................. G06K 15/00

[52] U.S. Cl. ........................ 395/108; 395/104; 395/114; 347/12; 347/41; 347/40; 178/25; 178/30

[58] Field of Search .................................. 395/108, 104, 395/101, 114–116, 109, 117; 347/12–14, 20, 23, 40–42, 74; 178/25, 30

[56] References Cited

U.S. PATENT DOCUMENTS

| | | | |
|---|---|---|---|
| 4,059,183 | 11/1977 | Hoskins | 400/124.27 |
| 4,084,195 | 4/1978 | Pereira | 347/41 |
| 4,194,210 | 3/1980 | Krause | 347/77 |
| 4,567,570 | 1/1986 | Peer | 395/108 |
| 4,783,667 | 11/1988 | Brooks | 347/195 |
| 5,048,984 | 9/1991 | Kringe et al. | 400/124.02 |
| 5,526,470 | 6/1996 | Enter | 347/40 |

FOREIGN PATENT DOCUMENTS

| | | |
|---|---|---|
| 2-67156 | 3/1990 | Japan . |
| 5-77488 | 3/1993 | Japan . |

*Primary Examiner*—Dwayne Bost
*Assistant Examiner*—Tracy M. Legree
*Attorney, Agent, or Firm*—Armstrong, Westerman, Hattori, McLeland & Naughton

[57] ABSTRACT

A device for printing print data after converting the print data into converted print data includes a head unit for printing the converted print data by moving in a scanning direction, the head unit having at least one head line in which print elements are arranged diagonally with respect to the scanning direction, a row-order-conversion unit for rearranging rows of the print data according to an arrangement of the print elements so as to generate row-converted print data, and a column-order-conversion unit for rearranging column positions of the row-converted print data according to the arrangement of the print elements so as to generate the converted print data.

19 Claims, 20 Drawing Sheets

FIG. 10

COLUMN

ROW

| dummy | dummy | dummy | 1 | 2 | 3 | 4 | 5 | 6 | 7 | 8 | 9 | 10 |
|---|---|---|---|---|---|---|---|---|---|---|---|---|
| 0 | 0 | 0 | A | A | A | A | A | | | | | |
| 0 | 0 | 0 | B | B | B | B | B | | | | | |
| 0 | 0 | 0 | C | C | C | C | C | | | | | |
| 0 | 0 | 0 | D | D | D | D | D | | | | | |
| 0 | 0 | 0 | A | A | A | A | A | | | | | |
| 0 | 0 | 0 | B | B | B | B | B | | | | | |
| 0 | 0 | 0 | C | C | C | C | C | | | | | |
| 0 | 0 | 0 | D | D | D | D | D | | | | | |
| 0 | 0 | 0 | A | A | A | A | A | | | | | |
| 0 | 0 | 0 | B | B | B | B | B | | | | | |
| 0 | 0 | 0 | C | C | C | C | C | | | | | |
| 0 | 0 | 0 | D | D | D | D | D | | | | | |
| 0 | 0 | 0 | A | A | A | A | A | | | | | |
| 0 | 0 | 0 | B | B | B | B | B | | | | | |
| 0 | 0 | 0 | C | C | C | C | C | | | | | |
| 0 | 0 | 0 | D | D | D | D | D | | | | | |
| 0 | 0 | 0 | A | A | A | A | A | | | | | |
| 0 | 0 | 0 | B | B | B | B | B | | | | | |
| 0 | 0 | 0 | C | C | C | C | C | | | | | |
| 0 | 0 | 0 | D | D | D | D | D | | | | | |
| 0 | 0 | 0 | A | A | A | A | A | | | | | |
| 0 | 0 | 0 | B | B | B | B | B | | | | | |
| 0 | 0 | 0 | C | C | C | C | C | | | | | |
| 0 | 0 | 0 | D | D | D | D | D | | | | | |
| 0 | 0 | 0 | A | A | A | A | A | | | | | |
| 0 | 0 | 0 | B | B | B | B | B | | | | | |
| 0 | 0 | 0 | C | C | C | C | C | | | | | |
| 0 | 0 | 0 | D | D | D | D | D | | | | | |
| 0 | 0 | 0 | A | A | A | A | A | | | | | |
| 0 | 0 | 0 | B | B | B | B | B | | | | | |
| 0 | 0 | 0 | C | C | C | C | C | | | | | |
| 0 | 0 | 0 | D | D | D | D | D | | | | | |

| | | | | | |
|---|---|---|---|---|---|
| n | n+1 | n+2 | n+3 | n+4 | |

FIG. 13A  DATA RECEIVING

| | | | | | |
|---|---|---|---|---|---|
| | n | n+1 | n+2 | n+3 | n+4 |

FIG. 13B  BITMAP EXPANSION

| | | | | | |
|---|---|---|---|---|---|
| | | n | n+1 | n+2 | n+3 |

FIG. 13C  ORDER CONVERSION

| | | | | | |
|---|---|---|---|---|---|
| | | | n | n+1 | n+2 |

FIG. 13D  PRINTING

PRINT CONTROLLING METHOD AND PRINTER DEVICE

BACKGROUND OF THE INVENTION

1. Field of the Invention

The present invention generally relates to print controlling methods and printing devices, and more particularly relates to a print controlling method and a printing device which uses a head line arranged in a diagonal direction with respect to a scanning direction.

2. Description of the Related Art

In dot-matrix printers, a higher dot density is required for meeting a demand for higher resolution of printed documents.

In order to increase dot densities, distances between elements of a head line used in a printer head must be decreased. However, a printer head of an impact type requires a driving coil, and this bulky driving coil makes it difficult to increase the dot density. Also, a printer head of the ink-jet type uses a piezoelectric element for each dot, and the difficulty in decreasing a size of the piezoelectric element hinders efforts to increase the dot density.

In order to circumvent these problems, a method of arranging the head line in a diagonal direction with respect to a scanning direction has been used. This method aims at achieving a high dot density by using a printer head of a relatively low dot density.

In printers using the diagonally arranged head line, printing is carried out at different positions from printing positions of the head line of a conventional printer head. Thus, there is a need to convert print data so that converted print data can be printed by the diagonally arranged head line to appear as a normal printout. Then, there is a need to carry out this conversion process efficiently.

FIG. 1 is a block diagram of a dot-matrix printer device of the related art. A receiving unit 310 receives print data from a host computer 320. Then, the print data received by the receiving unit 310 is supplied to a bitmap expanding unit 330.

The bitmap expanding unit 330 converts the print data to pixel-pattern data (bitmap data), and stores the bitmap data in a data storage unit 340. The bitmap data stored in the data storage unit 340 is supplied to a head driving unit 350 via the bitmap expanding unit 330.

The head driving unit 350 drives a head unit 360 based on the bitmap data supplied from the data storage unit 340.

In the head unit 360, head nozzles for the ink-jet type or pin wires (print pins) for the impact type are arranged in a transverse direction with respect to the scanning direction, and print the bitmap data by moving in the scanning direction. Hereinafter, the head nozzles and the pin wires (print pins) are referred to as print elements.

However, as noted before, it is difficult to bring down the size of the driving coil in the impact-type printers, and difficult to bring down the size of the piezoelectric elements in the ink-jet type printers. Thus, distances between the print elements cannot be narrowed beyond a certain extent to achieve printing of a high dot density.

In order to obviate this problem, some printer devices have a diagonally arranged head line in which print elements are arranged in a diagonal direction with respect to the scanning direction.

FIG. 2 is a block diagram of a printer device of the related art which has a head line diagonally arranged with respect to the scanning direction. In FIG. 2, the same elements as those of FIG. 1 are referred to by the same numerals, and a description thereof be omitted.

A head unit 410 has head lines (print element lines) 411 which are arranged in a diagonal direction with respect to a scanning direction Y. In the head unit 410, the density of the print elements is increased by decreasing distances in a transverse direction between the print elements.

If the bitmap data used for the head unit 360 of FIG. 1 having the transverse head line is used for the head unit 410, displacements of printing positions caused by displacements of print elements in the scanning direction bring about a distorted appearance of information on printouts. Thus, a driving-order conversion unit 420 is provided between the data storage unit 340 and the head driving unit 350 to convert the order in which data is supplied to the head according to the number and the angle of the head lines. The driving-order conversion unit 420 is structured by a firmware using MCU (micro control unit) and the like.

In the related-art printer devices having diagonal head lines, the conversion process for the diagonal head lines is entirely carried out by firmware based on the MCU in a control unit. Thus, the conversion process requires a long processing time, so that the processing speed is not satisfactorily high. Instead of using firmware, special hardware can be used for processing the driving-order conversion for the diagonal lines. When intervals between the print elements and/or the number of the print elements are large, however, the memory volume provided in the driving-order conversion unit increases proportionally, which leads to an increased cost of the conversion unit.

Accordingly, there is a need in the field of printers for a print controlling method and a printing device which can efficiently convert print data for diagonally arranged head lines.

SUMMARY OF THE INVENTION

It is a general object of the present invention to provide a print controlling method and a printing device which can satisfy the need described above.

It is another and more specific object of the present invention to provide a print controlling method and a printing device which can efficiently convert print data for diagonally arranged head lines.

In order to achieve the above objects according to the present invention, a device for printing print data after converting the print data into converted print data includes a head unit for printing the converted print data by moving in a scanning direction, the head unit having at least one head line in which print elements are arranged diagonally with respect to the scanning direction, a row-order-conversion unit for rearranging rows of the print data according to an arrangement of the print elements so as to generate row-converted print data, and a column-order-conversion unit for rearranging column positions of the row-converted print data according to the arrangement of the print elements so as to generate the converted print data.

The same objects can be achieved according to the present invention by a method of converting print data into converted print data to print the converted print data by using a head unit having at least one head line in which print elements are arranged diagonally with respect to a scanning direction of the head unit. The method includes the steps of rearranging rows of the print data according to an arrangement of the print elements so as to generate row-converted print data, rearranging column positions of the row-converted print data according to the arrangement of the print elements so as to generate the converted print data, and printing the converted print data by using the head unit.

In the device and the method described above, the row-order-conversion unit or the step a) rearranges the row positions of the print data, and the column-order-conversion unit or the step b) rearranges the column positions of the row-converted print data so as to take into account the displacements of the head lines which are arranged diagonally with respect to the scanning direction. Thus, the converted print data which can be printed by the diagonally arranged head lines to produce normal printouts is obtained.

Other objects and further features of the present invention will be apparent from the following detailed description when read in conjunction with the accompanying drawings.

BRIEF DESCRIPTION OF THE DRAWINGS

FIG. 10 is an illustrative drawing showing the bitmap data stored in a bitmap-data-storage unit of a data-storage unit by a bitmap expanding unit in FIG. 4;

DESCRIPTION OF THE PREFERRED EMBODIMENTS

In the following, a principle and embodiments of the present invention will be described with reference to the accompanying drawings.

Figure 1:
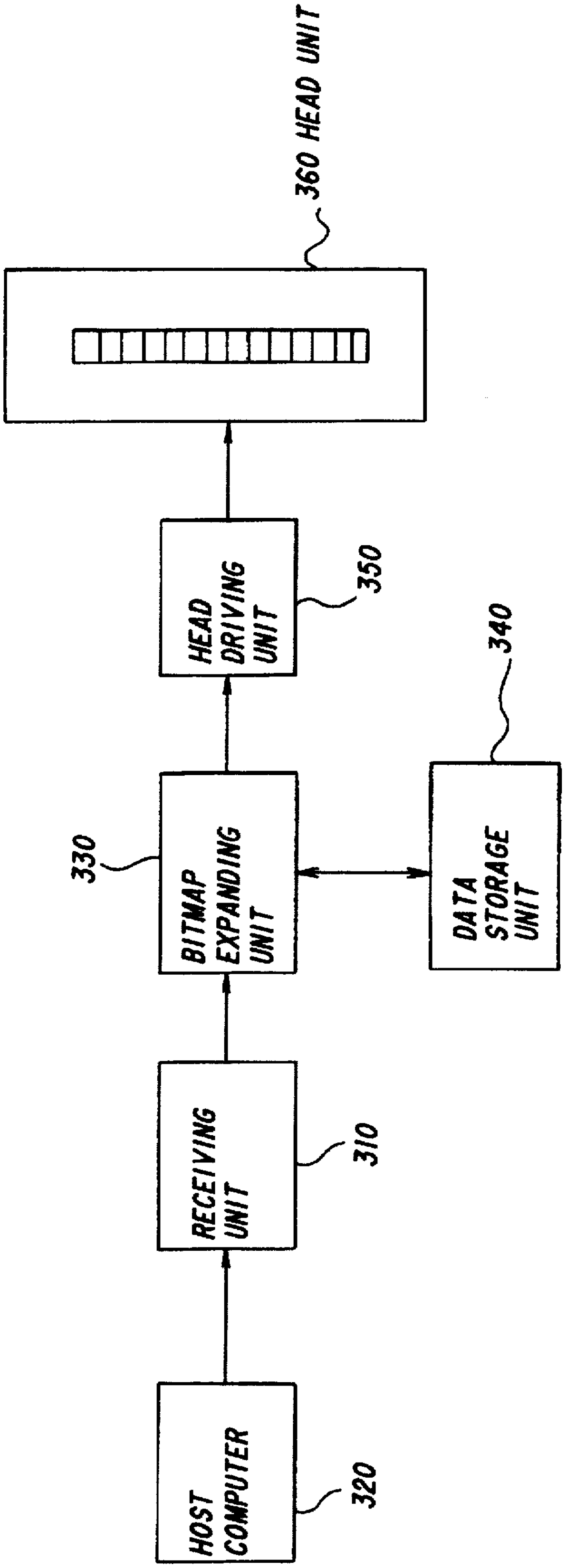
FIG. 1 is a block diagram of a dot-matrix printer device of the related art.
Figure 2:
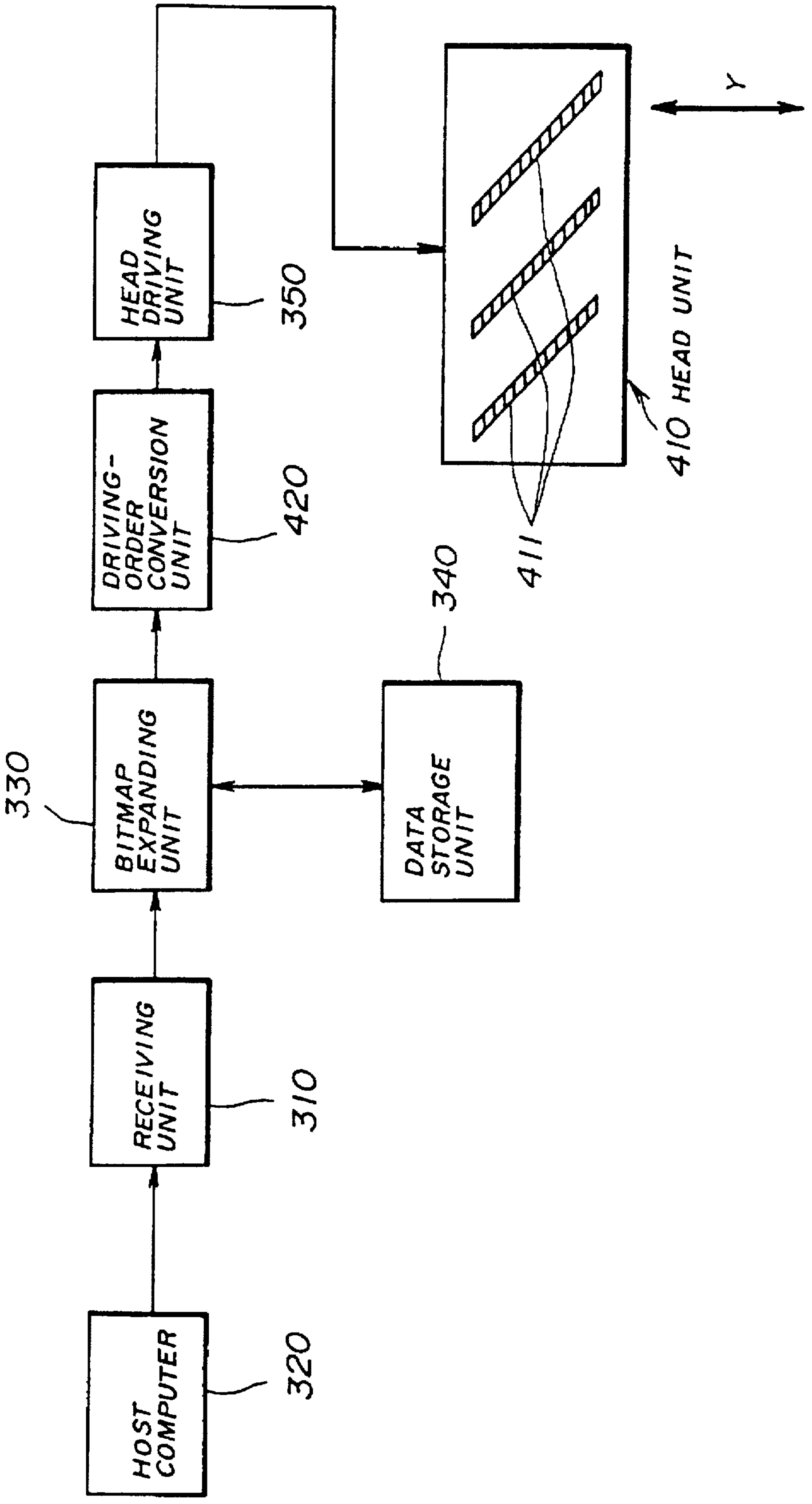
FIG. 2 is a block diagram of a printer device of the related art which has a head line diagonally arranged with respect to the scanning direction.
Figure 3A:
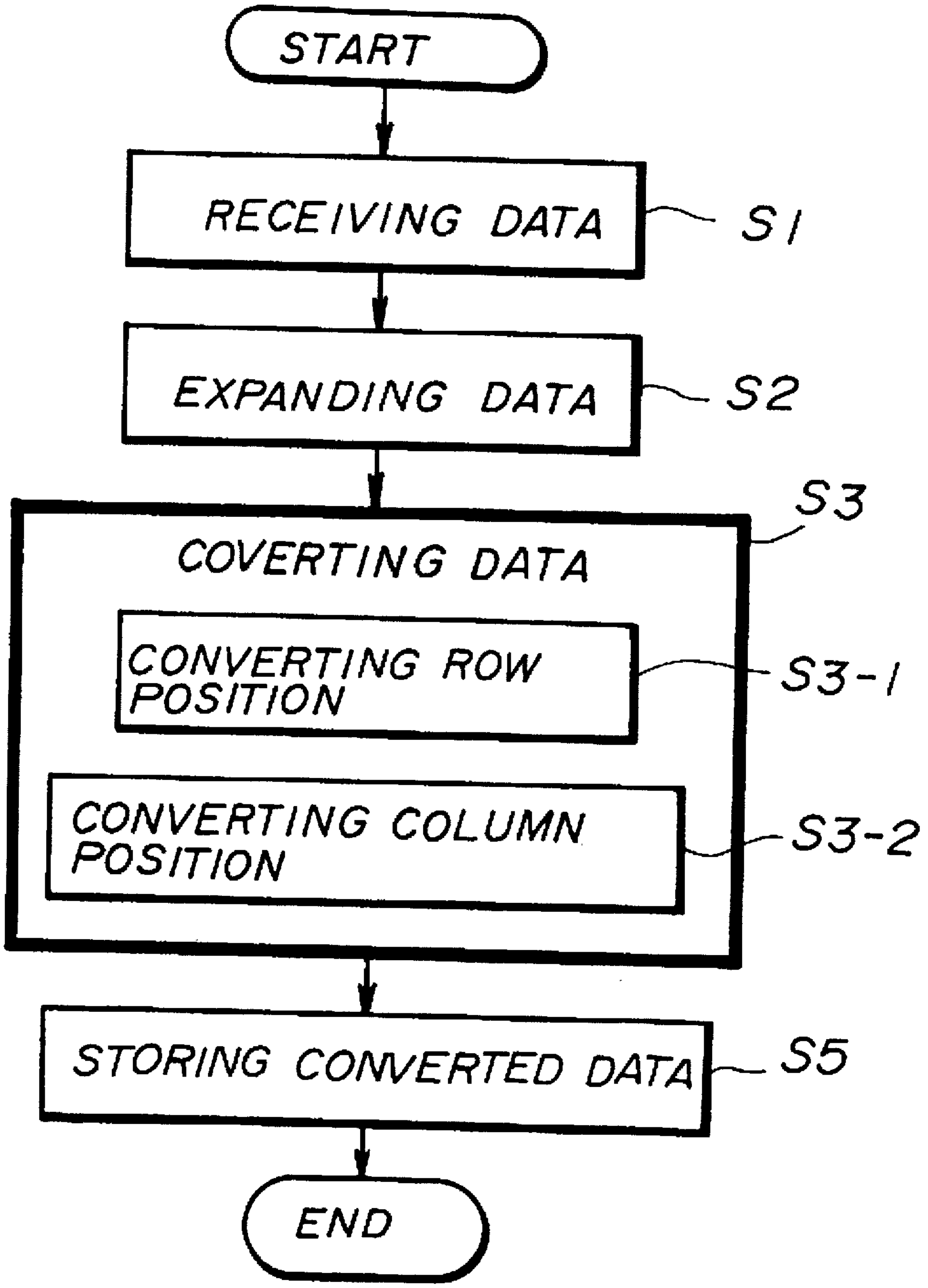
FIGS. 3A and 3B are a flow chart of a printing method and a block diagram of a printing device, respectively, according to a principle of the present invention.
Figure 3B:
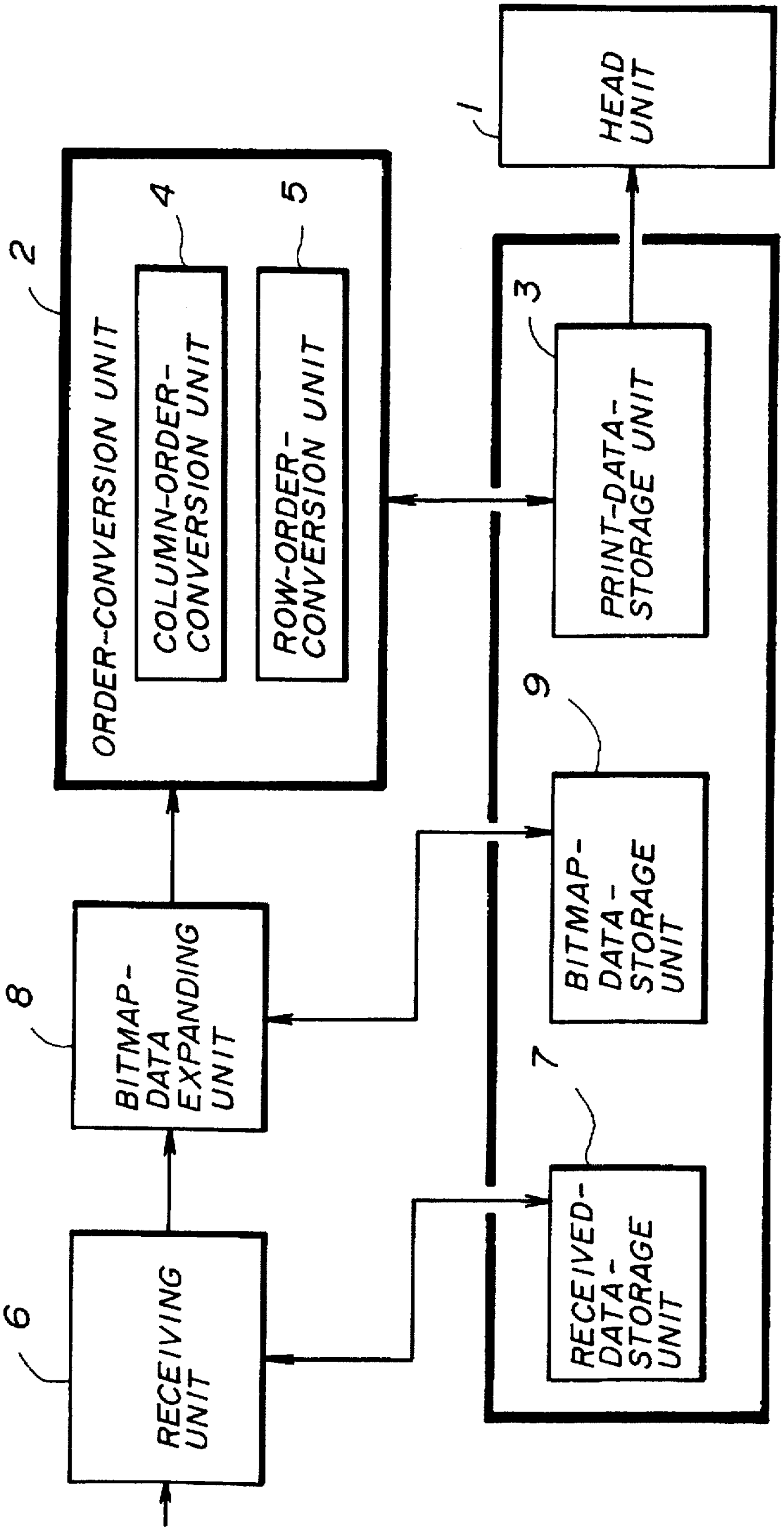

FIGS. 3A and 3B show a flow chart of a printing method and a block diagram of a printing device, respectively, according to a principle of the present invention.

In FIG. 3A, at a step S1, print data is received and stored.

At a step S2, the stored print data is expanded into bitmap data corresponding to print pixels, and the bitmap data is stored.

At a step S3, dots of the bitmap data are rearranged such that dots in the same column position (position in a scanning direction) are printed by diagonally arranged head lines in the same column position. Namely, column positions in the bitmap data are shifted to cancel displacements of the print elements of the head lines which are arranged in a diagonal direction with respect to the scanning direction. Here, the terminology "print element" refers to a nozzle or a print pin.

The step S3 includes a step S3-1 and a step S3-2. At the step S3-1, dots of the bitmap data are rearranged to change row positions (positions in an transverse direction) thereof. In this process, row orders in the bitmap data are changed such that dots to be printed by print elements arranged in the same column position are collected to form a group. At the step S3-2, dots of the bitmap data are rearranged to change column positions thereof. In this process, each group of dots are shifted to change its column position such that dots which should be printed in the same column position are printed in the same column position.

At a step S5, converted bitmap data is stored in a print data storage unit.

In FIG. 3B, the printer device according to the principle of the present invention includes a head unit 1, an order-conversion unit 2, a print-data-storage unit 3, a receiving unit 6, a received-data-storage unit 7, a bitmap-data expanding unit 8, and a bitmap-data-storage unit 9. The head unit 1 has head lines diagonally arranged with respect to the travel direction thereof, and is driven to print the print data stored in the print-data-storage unit 3.

The order-conversion unit 2 converts the bitmap data into the print data in which the displacements of the head lines in the scanning direction are taken into account. The print-data-storage unit 3 stores the print data which is generated by the order-conversion unit 2.

The order-conversion unit 2 includes a column-order-conversion unit 4 which converts the column positions of the bitmap data according to the displacements of the line head in the scanning direction, and includes a row-order-conversion unit 5 which converts the row positions of the bitmap data according to the arrangement of the head lines. The receiving unit 6 receives initial print data. The received-data-storage unit 7 stores the initial print data received by the receiving unit 6.

The bitmap-data expanding unit 8 expands the initial data stored in the received-data-storage unit 7 into the bitmap data having dots corresponding to print pixels. The bitmap-data-storage unit 9 stores the bitmap data expanded by the bitmap-data expanding unit 8, which bitmap data is supplied to the order-conversion unit 2.

According to the principle of the present invention, dots of the bitmap data are rearranged first to change row positions thereof. In this process, row orders in the bitmap data are changed such that dots to be printed by print elements arranged in the same column position are collected to form a group. Then, dots of the bitmap data are rearranged to change column positions thereof. In this process, each group of dots are shifted to change its column position such that dots which should be printed in the same column position are printed in the same column position. In this manner, the print data for which the displacements of the head lines are taken into account is obtained.

Figure 4:
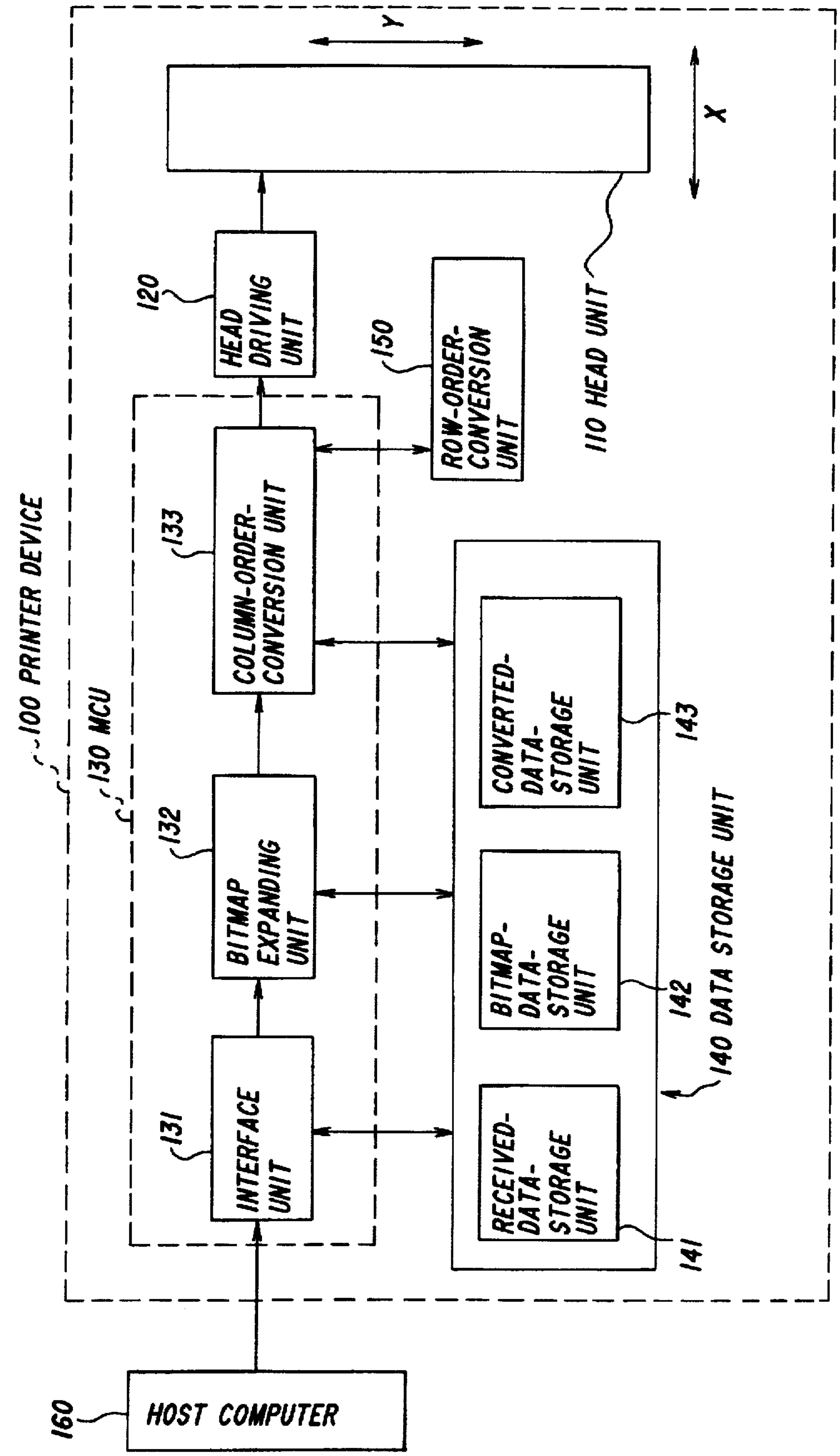
FIG. 4 is a block diagram of a printer device 100 according to a first embodiment of the present invention.

FIG. 4 is a block diagram of a printer device 100 according to a first embodiment of the present invention. The printer device 100 includes a head unit 110, a head driving unit 120, a MCU (micro-control unit) 130, a data-storage unit 140, and a row-order-conversion unit 150.

The head unit 110 includes diagonally arranged head lines. The head driving unit 120 drives the head unit 110. The MCU 130 receives initial print data, expands the initial print data into bitmap data (pixel pattern data), and converts column positions (shown by an arrow X) of the bitmap data according to the displacements of the diagonally arranged head lines. The data-storage unit 140 stores data processed by the MCU 130. The row-order-conversion unit 150 corresponding to the row-order-conversion unit 5 is structured by special-purpose hardware, and converts row positions (shown by an arrow Y) in the bitmap data according to an arrangement of the diagonally arranged head lines of the head unit 110.

The printer device 100 is connected to a host computer 160, from which the initial print data is supplied. The printer device 100 expands the initial print data into the bitmap data, converts positions in bitmap data, and drives the head unit 110 to print the converted bitmap data.

Figure 5:
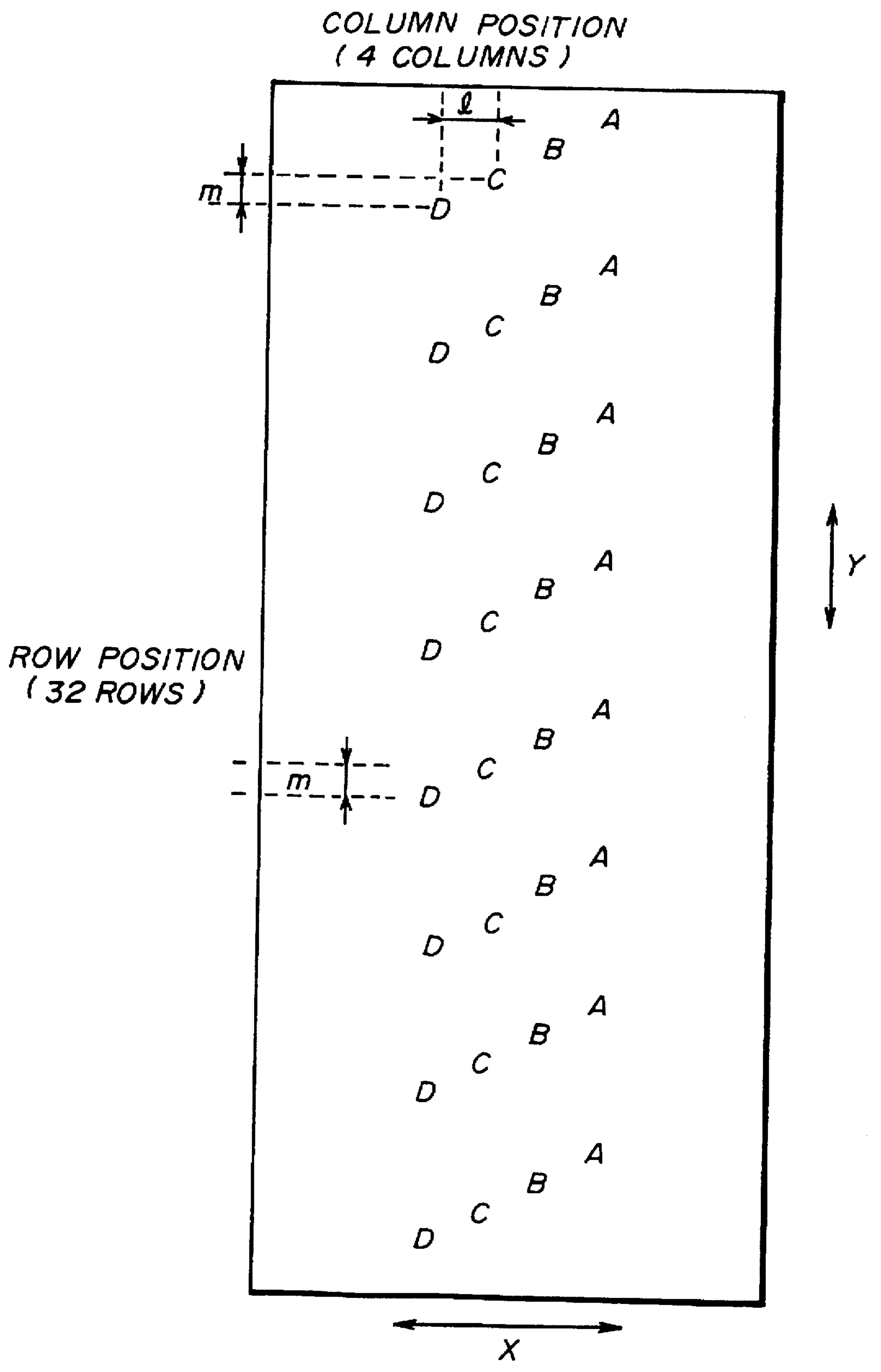
FIG. 5 is an illustrative drawing showing a configuration of a head unit of FIG. 4.

FIG. 5 is an illustrative drawing showing a configuration of the head unit 110. The head unit 110 corresponding to the head unit 1 is an ink-jet type head, for example. In FIG. 5, print-element positions of the head unit 110 are arranged diagonally with respect to a scanning direction X in 4 columns (a column number L is equal to 4) and 32 rows (a row number M is equal to 32) having a column interval l and a row interval m, respectively. In FIG. 5, A, B, C, and D represent print-element positions in the same column position, respectively.

The head driving unit 120 drives the print elements of the head unit 110 represented by A, B, C, and D simultaneously by using data stored in a converted-data storage unit 143 of the data-storage unit 140, wherein said data is read by the column-order-conversion unit 133.

The MCU 130 includes an interface unit 131, a bitmap expanding unit 132, and a column-order-conversion unit 133. The interface unit 131 corresponding to the receiving unit 6 receives the initial print data from the host computer 160, and stores the initial print data in the data-storage unit 140. The bitmap expanding unit 132 corresponding to the bitmap-data expanding unit 8 expands the initial print data received by the interface unit 131 into the bitmap data based on built-in font data and the like, and stores the bitmap data in the data-storage unit 140. The column-order-conversion unit 133 corresponding to the column-order-conversion unit 4 receives the bitmap data expanded by the bitmap expanding unit 132, makes the row-order-conversion unit 150 convert the row positions in the bitmap data, and, then, converts the column positions in the bitmap data.

The data-storage unit 140 is comprised of a single DRAM (dynamic random access memory), and includes a received-data-storage unit 141, a bitmap-data-storage unit 142, and the converted-data-storage unit 143. The received-data-storage unit 141 corresponding to the received-data-storage unit 7 stores the initial print data received by the interface unit 131. The bitmap-data-storage unit 142 corresponding to the bitmap-data-storage unit 9 stores the bitmap data expanded by the bitmap expanding unit 132. The converted-data-storage unit 143 corresponding to the print-data-storage unit 3 stores the converted data which is converted by the row-order-conversion unit 150 and the column-order-conversion unit 133.

Figure 6:
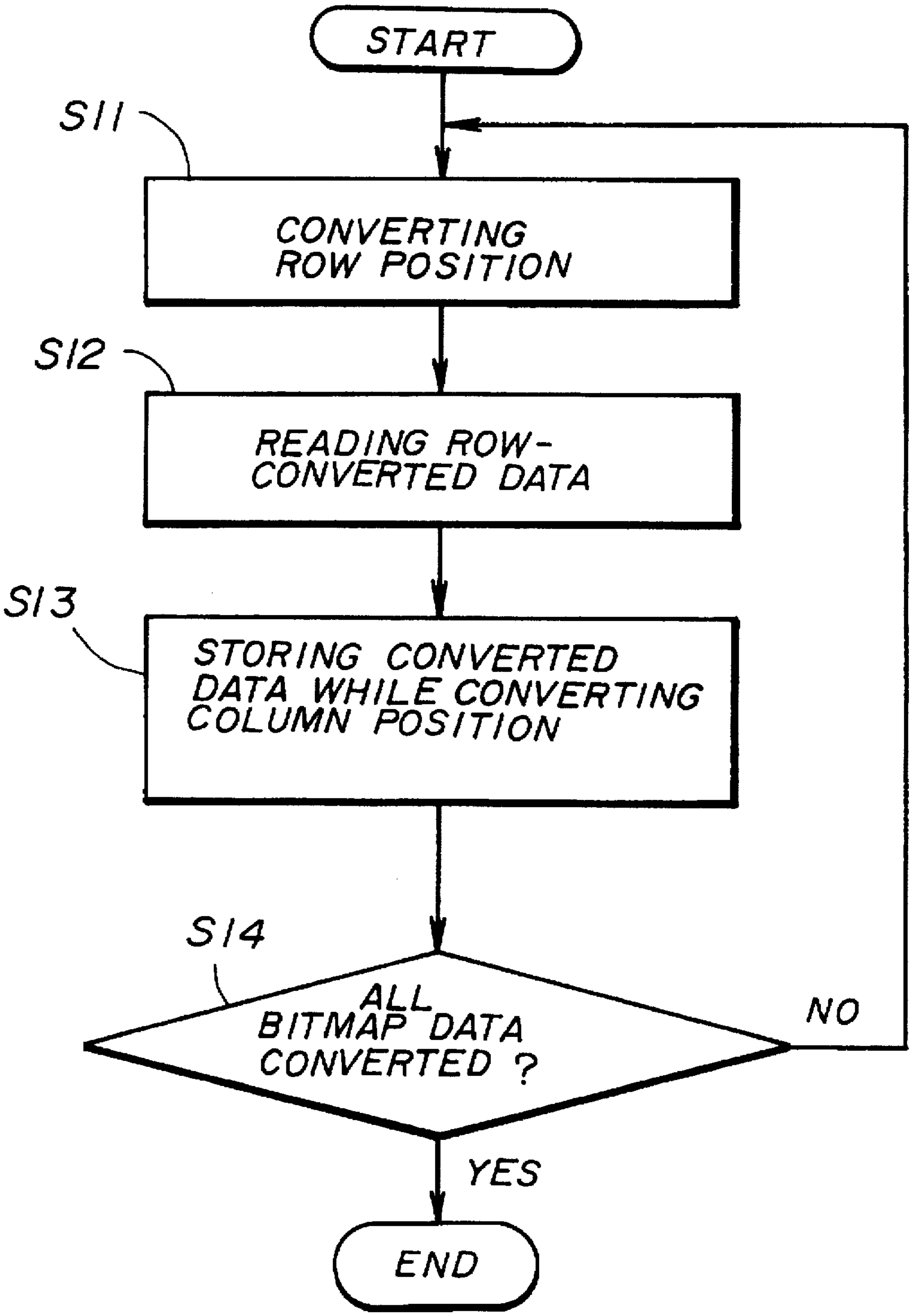
FIG. 6 is a flowchart of a process of a column-order-conversion unit of FIG. 4.

FIG. 6 is a flowchart of a process of the column-order-conversion unit 133.

At a step S11, the bitmap data stored in the bitmap-data-storage unit 142 is sent to the row-order-conversion unit 150 by the column-order-conversion unit 133. The row-order-conversion unit 150 rearranges dots of the bitmap data supplied by the column-order-conversion unit 133 so as to form groups in which dots of the same group are to be printed by print elements in the same column position.

At a step S12, the column-order-conversion unit 133 reads the bitmap data which is converted by the row-order-conversion unit 150.

At a step S13, the column-order-conversion unit 133 stores the bitmap data in the converted-data-storage unit 143 by shifting a writing address by an amount corresponding to the column interval l of the head lines of the head unit 110.

At a step S14, a check is made whether all the bitmap data stored in the bitmap-data-storage unit 142 is converted by the processes of the steps S12 and S13. If it is not, the procedure goes back to the step S11 to repeat the steps S11 through S13. If all the bitmap data is converted, the procedure ends at this point.

In this manner, the column-order-conversion unit 133 reads data for one column at a time from the bitmap-data-storage unit 142, and sends it to the row-order-conversion unit 150. In the row-order-conversion unit 150, the row positions of the data for one column are rearranged according to the row positions of the print elements provided in the same column positions. Then, the column-order-conversion unit 133 writes the converted data in the converted-data-storage unit 143 in an order of a group A, a group B, a group C, and a group D by shifting a writing address for each group by an amount corresponding to the column interval l of the print elements of the head unit 110. Here, dots of the groups A though D are printed by print elements represented by A through D, respectively. The process described here is repeated a number of times corresponding to a column number in the bitmap data.

Figure 7:
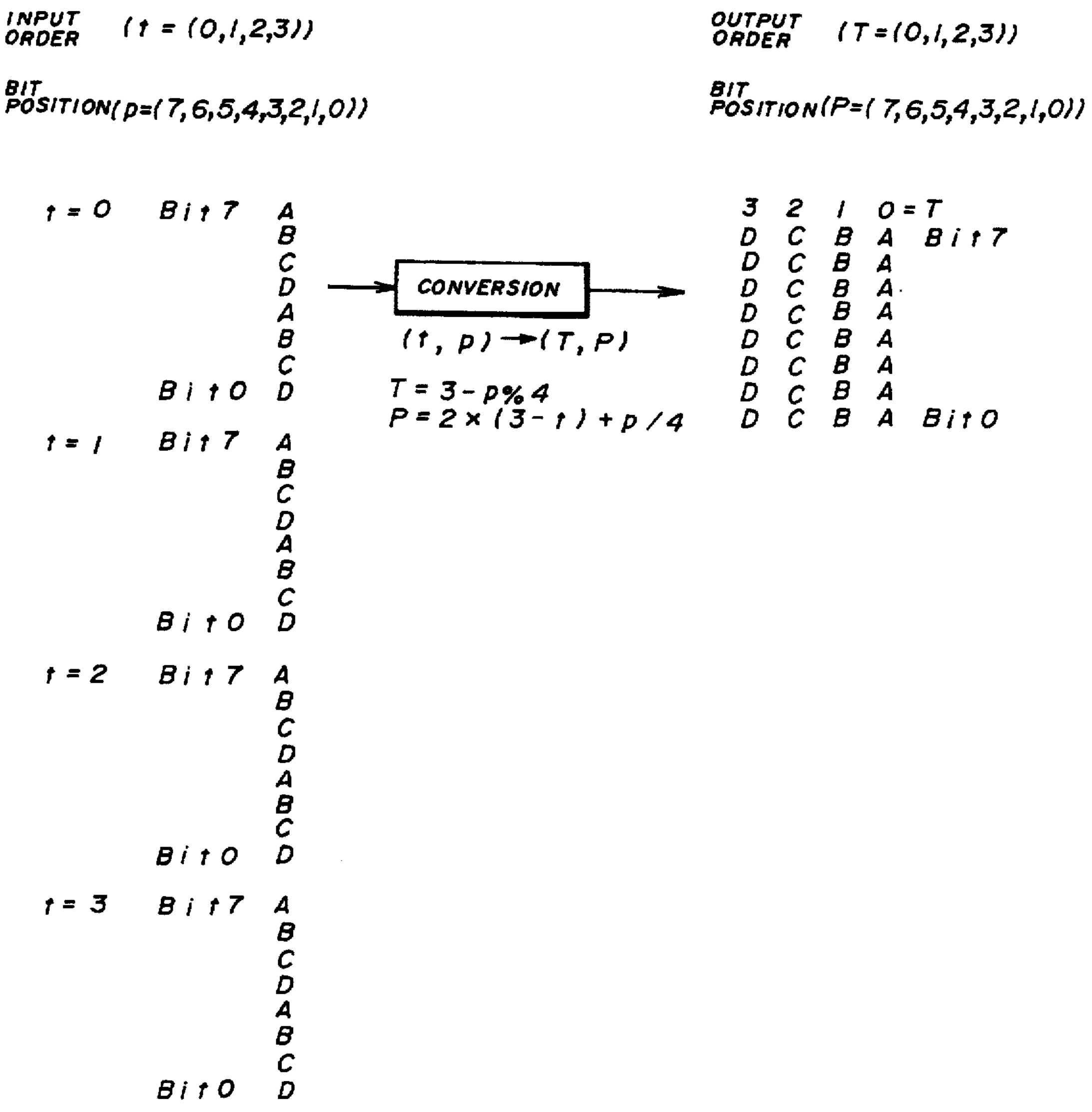
FIG. 7 is an illustrative drawing for explaining a process of a row-order-conversion unit of FIG. 4.

FIG. 7 is an illustrative drawing for explaining a process of the row-order-conversion unit 150.

As shown in FIG. 7, one column is comprised of 32 bits. Assume that 8-bit data is inputted at one time and that four chunks of 8-bit data are inputted in an order t (t=(0, 1, 2, 3)). A bit position in the 8-bit data is represented by a position p (p=(7, 6, 5, 4, 3, 2, 1, 0). An output order after the row-order conversion is represented by an order T (T=(0, 1, 2, 3)), in which a bit position in the 8-bit data is represented by a position P (P=(7, 6, 5, 4, 3, 2, 1, 0). Then, a conversion (t,p)→(T,P) by the row-order-conversion unit 150 is represented by $$T=3-p\%4 \quad (1)$$

$$P=2(3-t)+p/4 \quad (2)$$

wherein "p%4" represents a modulo 4 arithmetic (a remainder after dividing p by 4), and "p/4" represents a quotient of division by 4.

Through the conversion process described above, dots inputted in an order of A, B, C, and D corresponding to the column positions of the print elements are rearranged to form the groups A, B, C, and D. That is, the dots to be printed by the print elements in the same column position are formed into the same group.

Figure 8A:
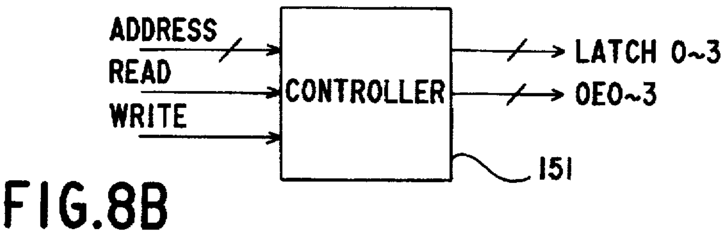
FIGS. 8A and 8B are block diagrams of the row-order-conversion unit when the row-order-conversion unit is structured by hardware.
Figure 8B:
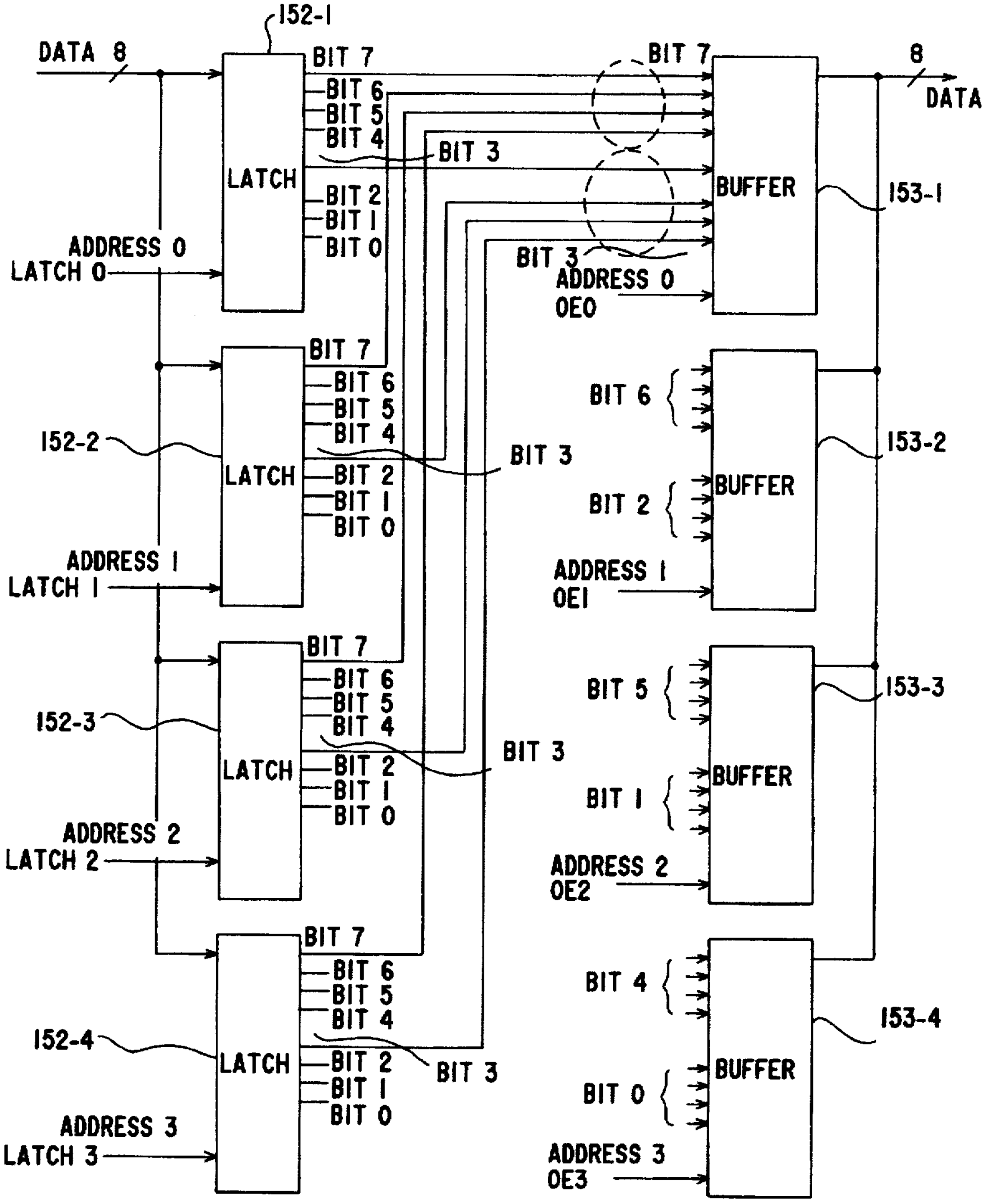
Figures 9A, 9B, 9C, 9D, 9E, 9F, 9G, 9H:
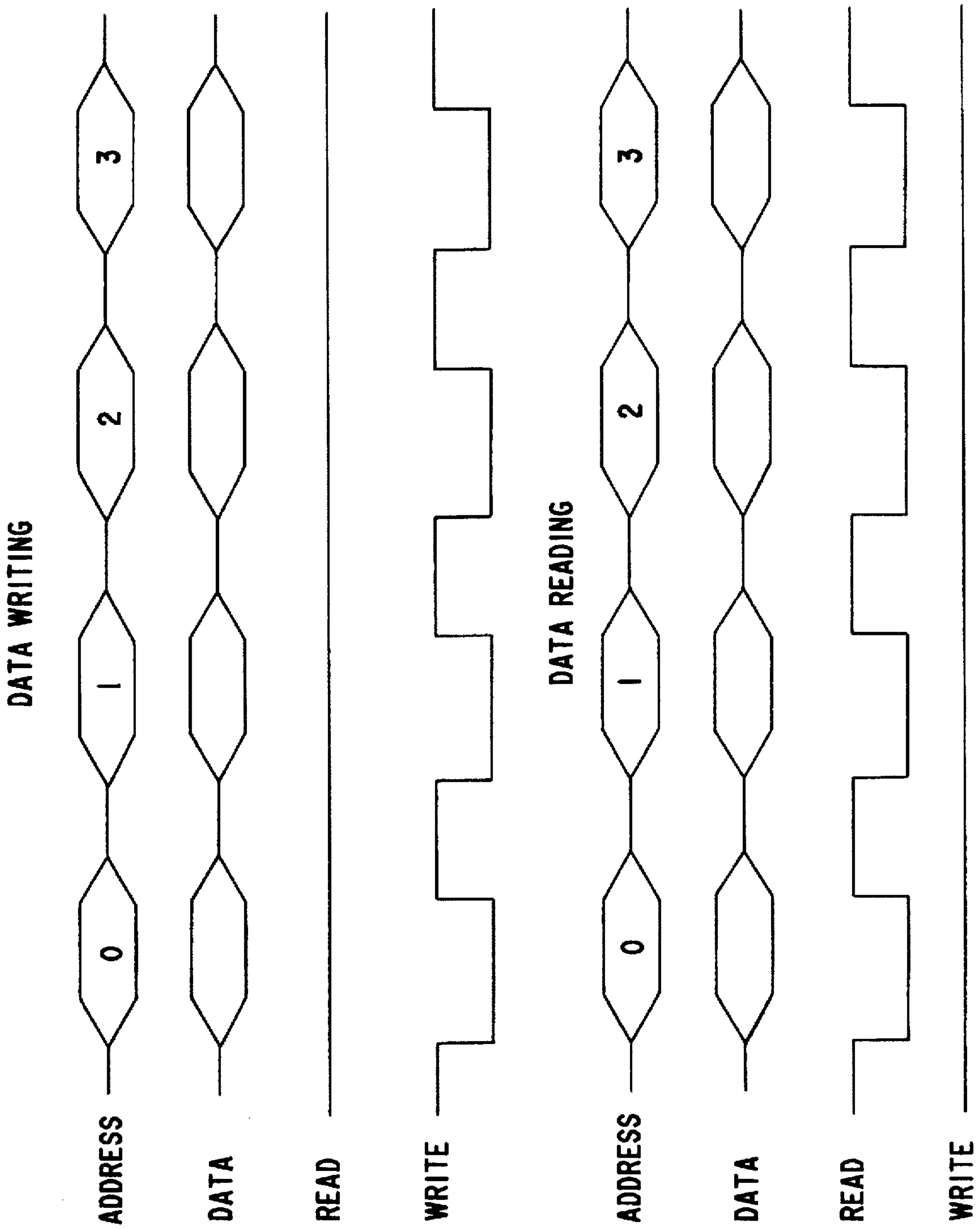
FIGS. 9A through 9H are time charts for explaining an operation of the row-order-conversion unit.

FIGS. 8A and 8B are block diagrams of the row-order-conversion unit 150 when the row-order-conversion unit 150 is structured by hardware. The row-order-conversion unit 150 includes a controller 151, latch circuits 152-1 through 152-4, and buffers 153-1 through 153-4.

The controller 151 generates latch signals (Latch0 through Latch3) and output control signals (OE0 through OE3) based on an address input. The latch circuits 152-1 through 152-4 latch supplied data based on the latch signals supplied from the controller 151. The buffers 153-1 through 153-4 hold the data latched by the latch circuits 152-1 through 152-4 by separating each bit of the data, and generate outputs based on the output control signals supplied from the controller 151.

The controller 151 is supplied with addresses of the bitmap data from the column-order-conversion unit 133, and supplied with Read/Write signals for determining whether to write or read data. The controller 151 supplies the latch signals (Latch0 through Latch3) to the latch circuits 152-1 through 152-4, respectively, in sequence each time the address input is provided.

8-bit data corresponding to "ABCDABCD" for each address is supplied to each of the latch circuits 152-1 through 152-4, which latch the data in sequence upon receiving the latch signals Latch0 through Latch3. Here, when the latch signal Latch0 is provided, the latch circuit 152-1 latches the data. Thus, the latch circuits 152-1 through 152-4 hold 32 bits of data in total.

Outputs of the latch circuits 152-1 through 152-4 are provided bit by bit to the buffers 153-1 through 153-4. Eighth bit bit7 and fourth bit bit3 of each of the latch circuits 152-1 through 152-4 are provided to the buffer 153-1. Seventh bit bit6 and third bit bit2 of each of the latch circuits 152-1 through 152-4 are provided to the buffer 153-2. Sixth bit bit5 and second bit bit1 of each of the latch circuits 152-1 through 152-4 are supplied to the buffer 153-3. Finally, fifth bit bit4 and first bit bit0 of each of the latch circuits 152-1 through 152-4 are supplied to the buffer 153-4.

The buffers 153-1 through 153-4 hold the data latched by the latch circuits 152-1 through 152-4, and generate outputs based on the output control signals OE0 through OE3 given by the controller 151.

The output control signals OE0 through OE3 given by the controller 151 are in synchronism with the latch signals Latch0 through Latch3. When the latch circuits 152-1 through 152-4 latch the data, the buffers 153-1 through 153-4 output data which is latched by the latch circuits 152-1 through 152-4 at a previous timing.

In this configuration, when 8-bit data "ABCDABCD" is supplied to each of the latch circuits 152-1 through 152-4, the buffer 153-1 holds 8-bit data "AAAAAAAA" and the buffer 153-2 holds 8-bit data "BBBBBBBB". Likewise, the buffer 153-3 holds 8-bit data "CCCCCCCC" and the buffer 153-4 holds 8-bit data "DDDDDDDD". This 8-bit data stored in the buffers 153-1 through 153-4 are output in sequence. In this manner, bits of the input data are rearranged to form groups by selecting every forth bit. Thus, the groups of bits for the print elements represented by A, B, C, and D of FIG. 5 are formed. In other words, the bits of the bitmap data which are to be printed by the print elements in the same column position are grouped together.

FIGS. 9A through 9H are time charts for explaining an operation of the row-order-conversion unit 150. FIGS. 9A through 9D show an example of signal patterns when the bitmap data is written in the row5 order-conversion unit 150. FIGS. 9E through 9H show an example of signal patterns when the bitmap data is read from the row-order-conversion unit 150.

As shown in FIGS. 9A through 9D, in the first embodiment, the data is written in the row-order-conversion unit 150 in an address sequence Ad0, Ad1, Ad2, and Ad3. Also, the data is read from the row-order-conversion unit 150 in the same address sequence Ad0, Ad1, Ad2, and Ad3.

The data read from the row-order-conversion unit 150 is written in the converted-data-storage unit 143 of the data-storage unit 140 by the column-order-conversion unit 133. In writing the data, the column-order-conversion unit 133 shifts each group of bits by an amount corresponding to the column interval l.

Figure 11:
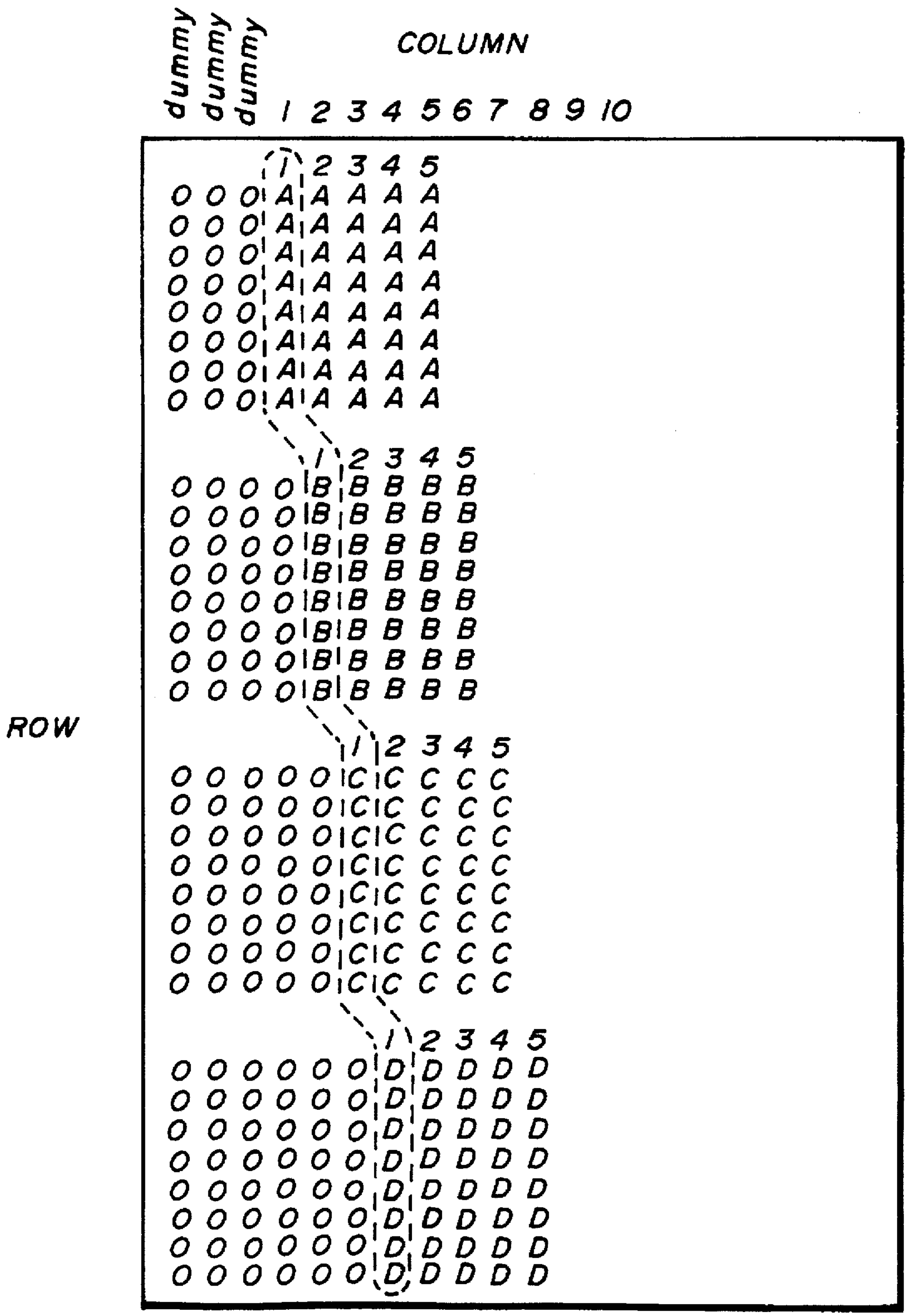
FIG. 11 is an illustrative drawing showing the converted data stored in a converted-data-storage unit of the data-storage unit after a conversion through the row-order-conversion unit and the column-order-conversion unit.
Figures 12A, 12B, 12C, 12D:
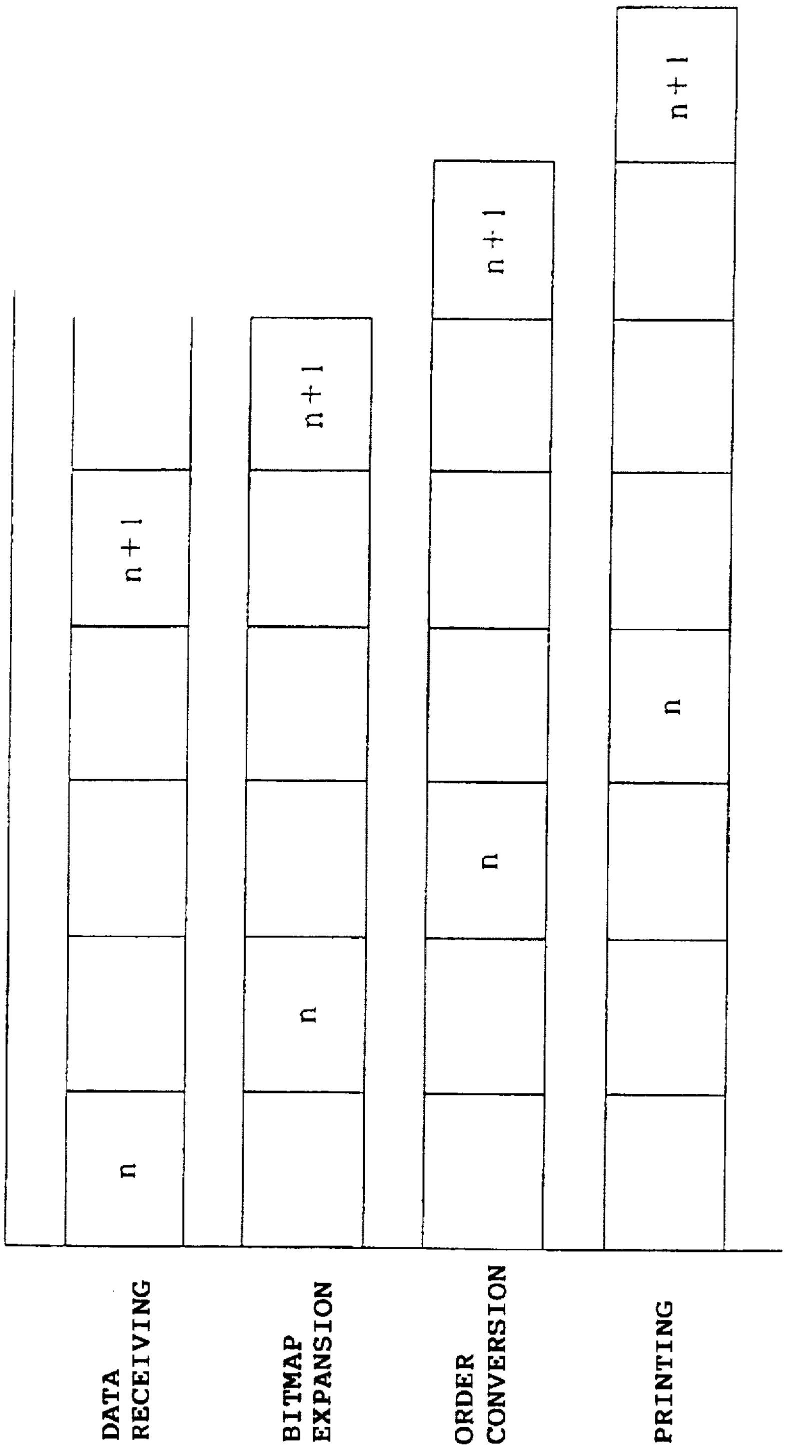
FIGS. 12A through 12D are time charts showing an operation of a printer device of FIG. 4.
Figures 13A, 13B, 13C, 13D:
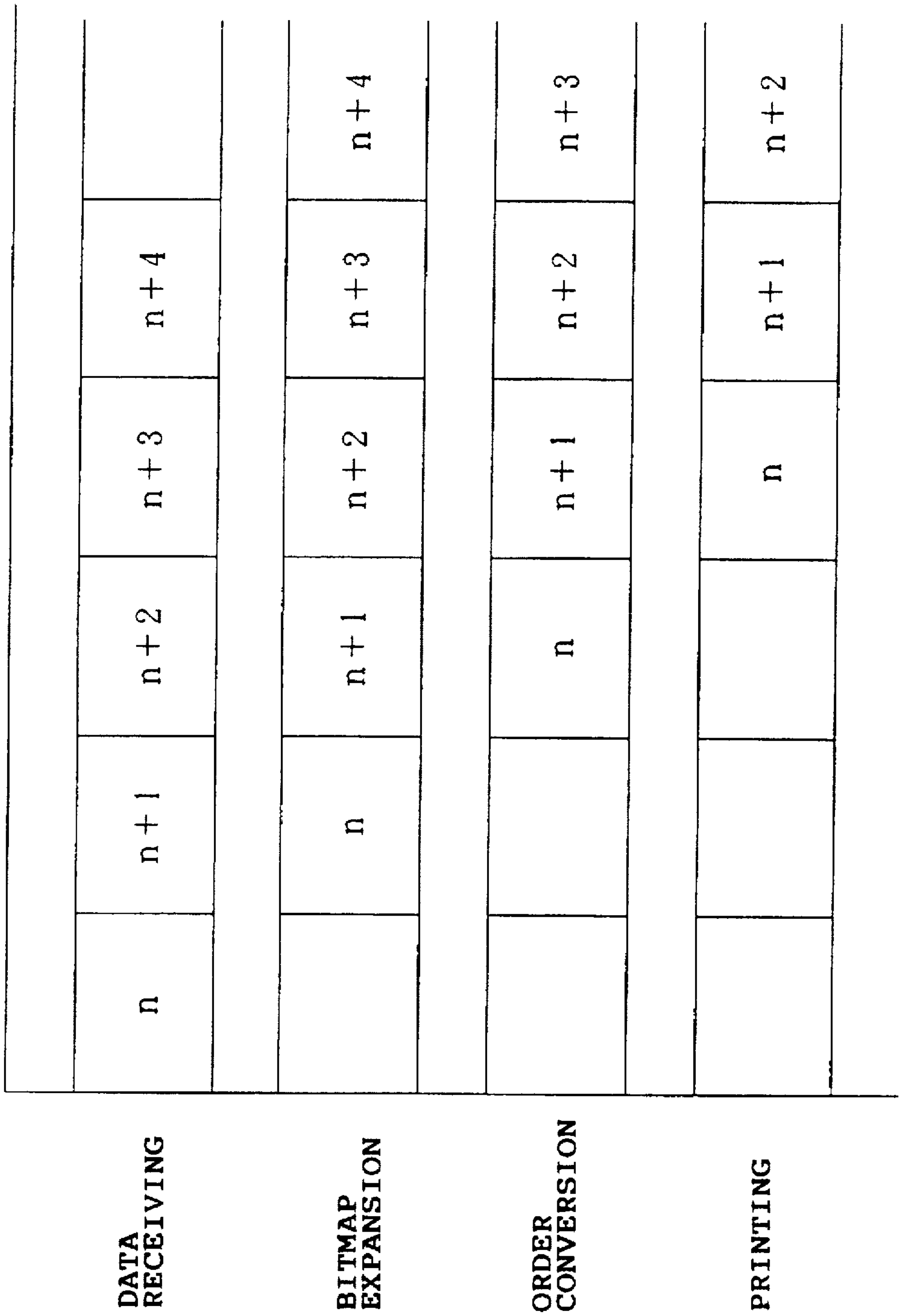
FIGS. 13A through 13D are other time charts showing an operation of the printer device.

FIG. 10 is an illustrative drawing showing the bitmap data stored in the bitmap-data-storage unit 142 of the data-storage unit 140 by the bitmap expanding unit 132. FIG. 11 is an illustrative drawing showing the converted data stored in the converted-data-storage unit 143 of the data-storage unit 140 after the conversion through the row-order-conversion unit 150 and the column-order-conversion unit 133. With reference to FIG. 10 and FIG. 11, an operation of the printer device 100 according to the first embodiment will be described below.

As shown in FIG. 10, the bitmap data stored in the bitmap-data-storage unit 142 are arranged without taking into account the positional relationships between the print elements A, B, C, and D. On the other hand, as shown in FIG. 11, the data converted by the row-order-conversion unit 150 and the column-order-conversion unit 133 are stored in the converted-data-storage unit 143 such that the groups of bits corresponding to the print elements A, B, C, and D are shifted by an amount corresponding to the respective column displacement. The column-order-conversion unit 133 reads the converted data column after column from the converted-data-storage unit 143, and supplies it to the head driving unit 120.

The head driving unit 120 prints the data in a sequence in which the data is supplied. That is, the head driving unit 120 prints 8-bit data "AAAAAAAA" of the first column first. Then, the head driving unit 120 prints 8-bit data "AAAAAAAA" of the second column and 8-bit data "BBBBBBBB" of the first column in this order. Then, the head driving unit 120 prints 8-bit data "AAAAAAAA" of the third column, 8-bit data "BBBBBBBB" of the second column, and 8-bit data "CCCCCCCC" of the first column in this order. Further, the head driving unit 120 prints 8-bit data "AAAAAAAA" of the fourth column, 8-bit data "BBBBBBBB" of the third column, 8-bit data "CCCCCCCC" of the second column, and 8-bit data "DDDDDDDD" of the first column in this order. These orders can be seen in FIG. 11 by tracing each of the 8-bit data chunks from the top to the bottom for each column of FIG. 11. In FIG. 11, data bits enclosed in a dotted-line loop are 32 bits of data stored in the first column of FIG. 10.

FIGS. 12A through 12D and FIGS. 13A through 13D are time charts showing an operation of the printer device 100 of the first embodiment. In FIGS. 12A through 12D, all the processes of the data receiving, the bitmap expansion, the order conversion, and the printing are carried out by the MCU 130 such that processing of one data line n is completed before a next data line n+1 is processed. That is, time charts of FIGS. 12A through 12D show a sequential operation, in which a given data line is processed during a shift of a print sheet.

In FIGS. 13A through 13D, each process of the data receiving, the bitmap expansion, the order conversion, and the printing is carried out simultaneously by the MCU 130 such that processing of the data line n for a given process is completed before starting processing of the data line n for a next process. That is, time charts of FIGS. 13A through 13D show a pipeline operation of each process. This pipeline operation enables continuous processing of the data lines, thus achieving a higher processing speed.

According to the first embodiment described above, the column conversion process is carried out by the MCU 130 based on software, and the row conversion process is carried out by the special-purpose hardware of the row-order-conversion unit 150. Thus, the size of the special-purpose hardware is small, and the process of converting the row and column orders is carried out at high speed.

FIGS. 14A through 14H are time charts showing signal patterns of a row-order-conversion unit according to a first variation of the first embodiment. A configuration of a printer device according to the first variation of the first embodiment is the same as that of the first embodiment, and, thus, a description thereof will be omitted.

In the first variation, a method of writing data in the row-order-conversion unit 150 by the column-order-conversion unit 133 differs from that shown in FIGS. 8A and 8B and FIGS. 9A through 9H.

Figures 14A, 14B, 14C, 14D, 14E, 14F, 14G, 14H:
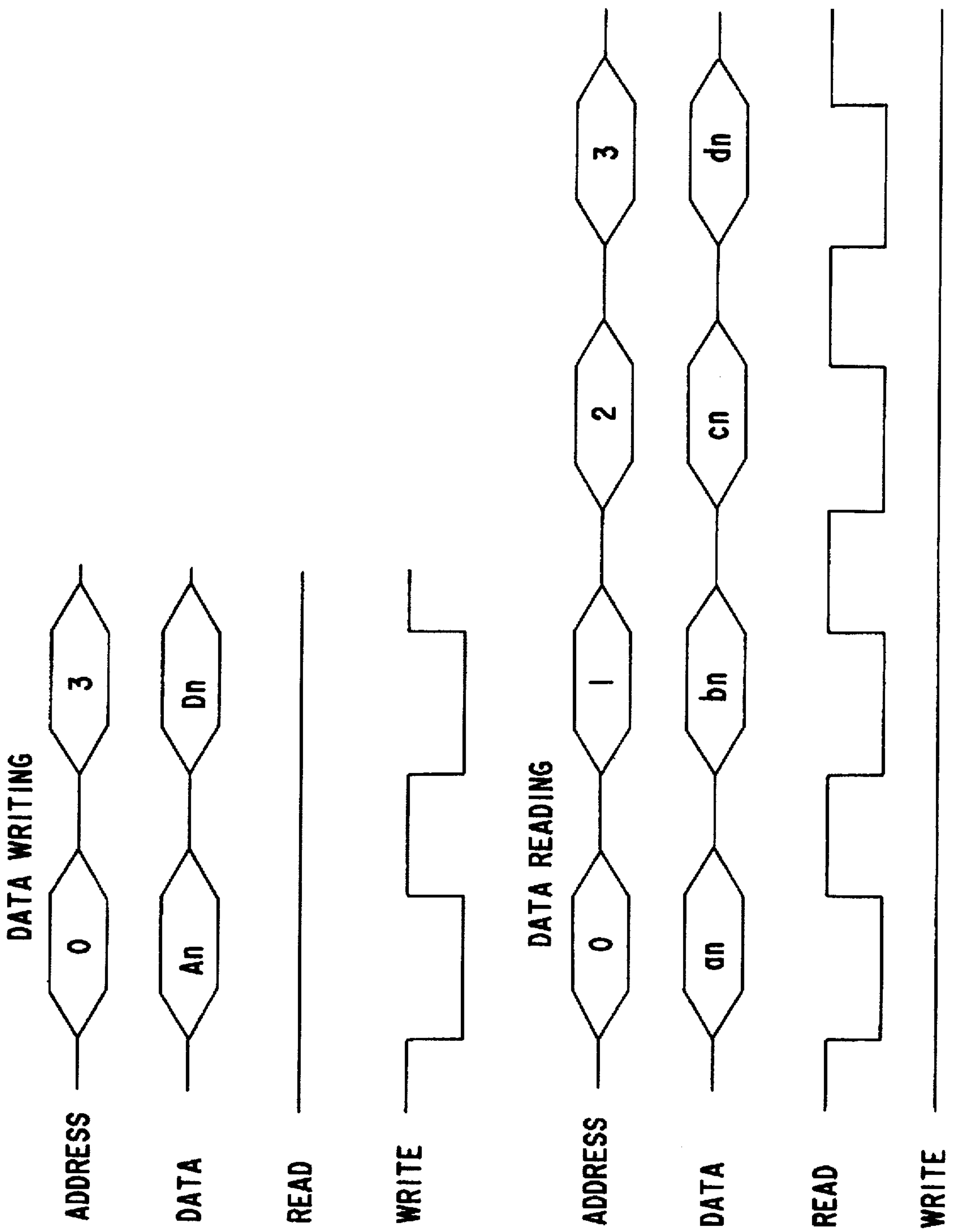
FIGS. 14A through 14H are time charts showing signal patterns of a row-order-conversion unit according to a first variation of the first embodiment.

In the first variation, when a column written in the row-order-conversion unit 150 is the same as an immediately preceding column, that column is not written in the row-order-conversion unit 150. As for data reading from the row-order-conversion unit 150, the data is read in the address order. For example, each 8-bit chunk of the 32-bit data is held after it is written in the row-order-conversion unit 150, and a newly arrived 8-bit chunk is compared with the one which is being held. Then, only if these 8-bit chunks are different, the newly arrived 8-bit chunk is written in the row-order-conversion unit 150. These processes of holding and comparing data are carried out by the column-order-conversion unit 133. In the example of FIGS. 14A through 14B, a data column n input to the row-order-conversion unit 150 differs from a data column n-1 in the first and fourth data chunks. As shown in FIGS. 14A through 14D, after data of each address is compared with previous data by the column-order-conversion unit 133, data An and Dn of addresses 0 and 3, respectively, is only written in the row-order-conversion unit 150 since data of addresses 1 and 2 are the same as the previous data.

When the data is read from the row-order-conversion unit 150, the data an, bn, cn, and dn is read from the address 0 to the address 3 in a sequence. Since the latch circuits 152-2 and 152-3 store the same data which should be written therein, correct data is obtained when the data read is from the row-order-conversion unit 150.

According to the first variation of the first embodiment, there is no need to write the same data as the previous data. Thus, memory handling is made faster to enhance processing speed.

Figure 15A:
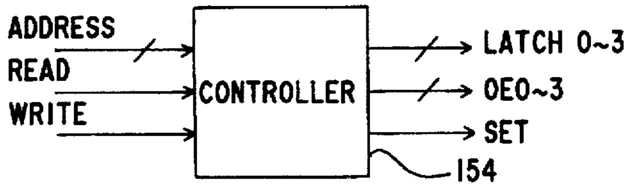
FIGS. 15A and 15B are block diagrams of a row-order-conversion unit according to a second variation of the first embodiment.
Figure 15B:
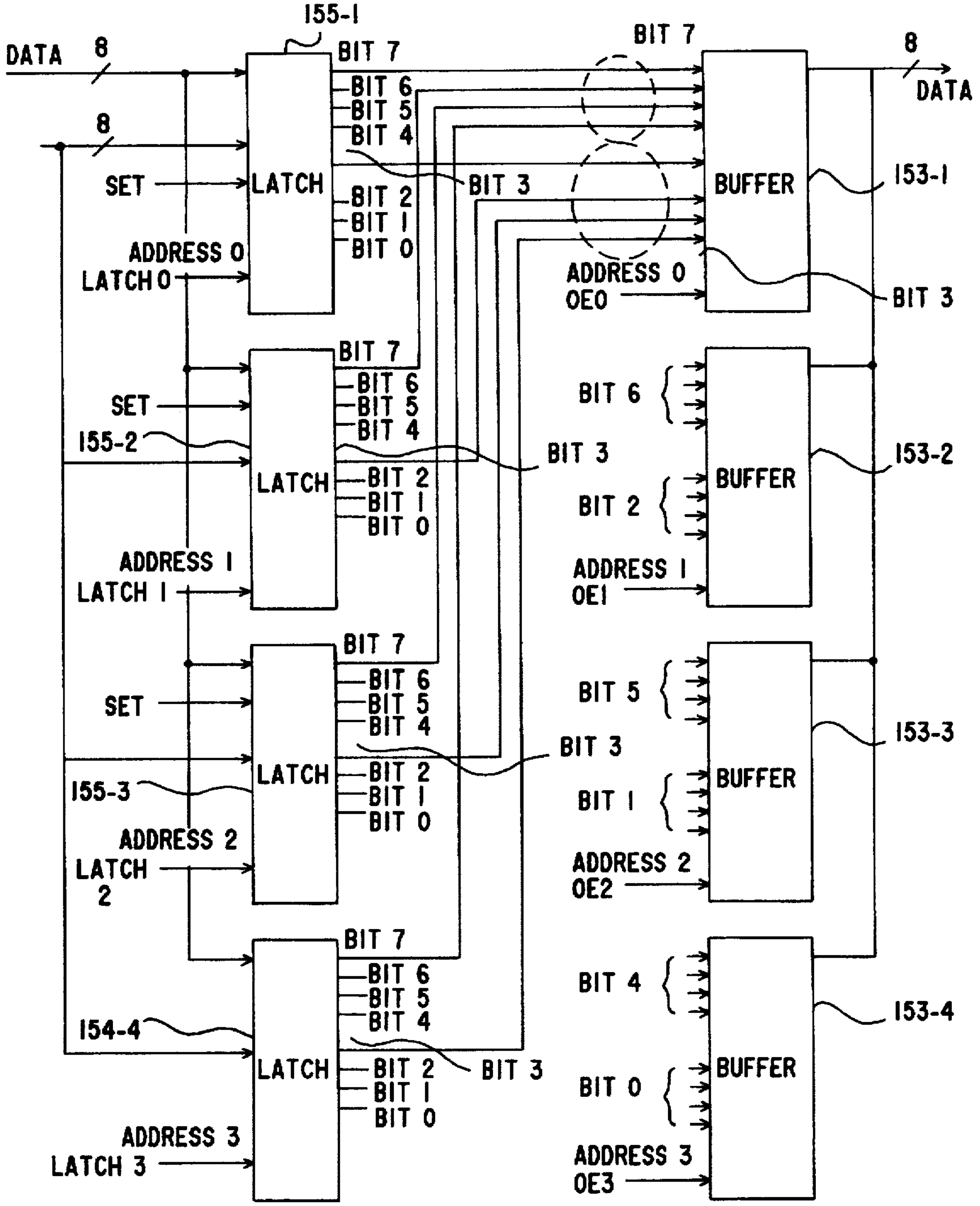
Figures 16A, 16B, 16C, 16D, 16E, 16F, 16G, 16H, 16I:
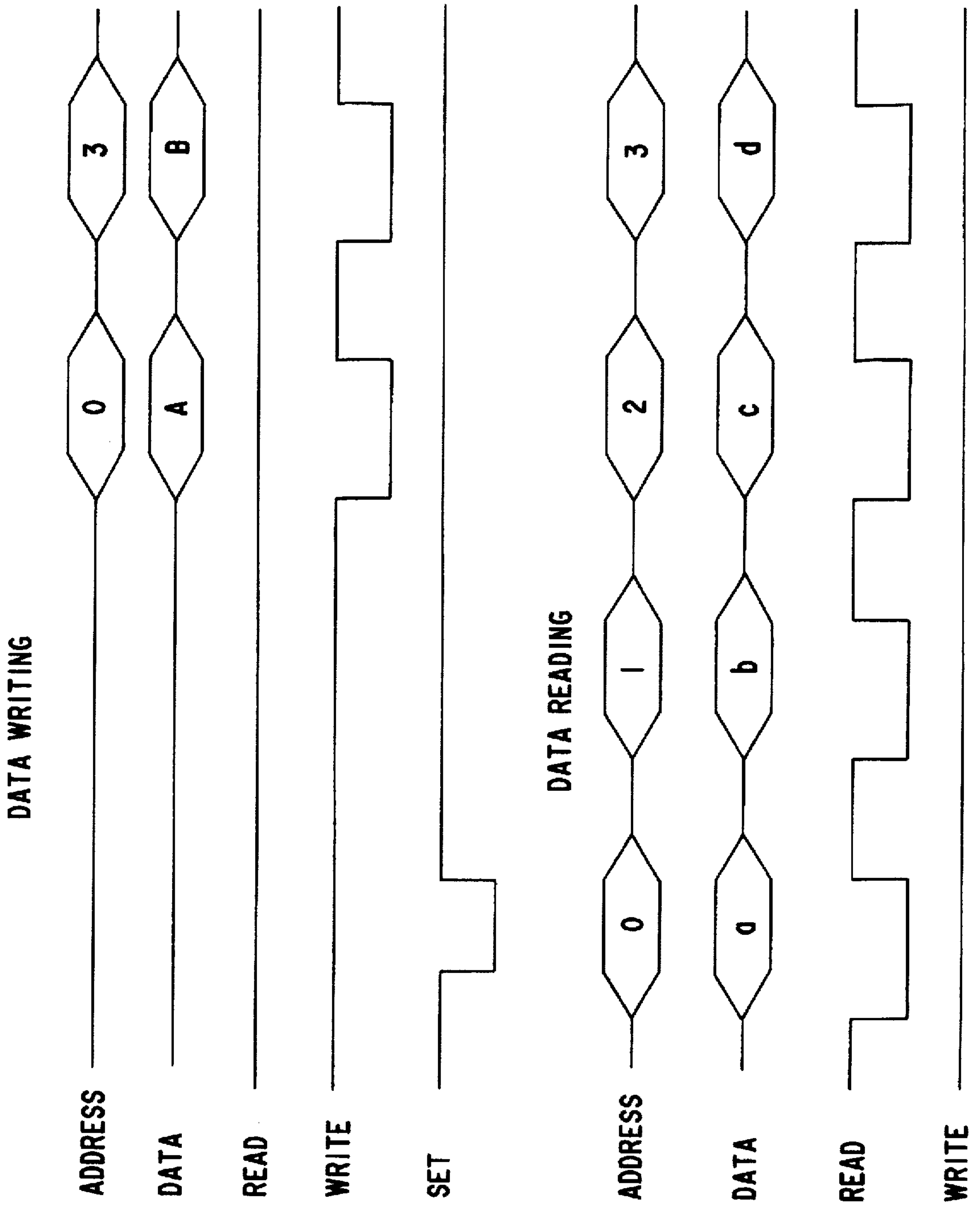
FIGS. 16A through 16I are time charts showing signal patterns of the row-order-conversion unit according to the second variation.

FIGS. 15A and 15B are block diagrams of a row-order-conversion unit according to a second variation of the first embodiment. In FIGS. 15A and 15B, the same elements as those of FIGS. 8A and 8B are referred to by the same numerals, and a description thereof will be omitted.

In the second variation, the row-order-conversion unit differs from that of FIGS. 8A and 8B in configurations of the controller and the latch circuits. The controller 154 generates a set signal SET in addition to the latch signals Latch0 through Latch3 and the output control signals OE0 through OE3, based on the address and read/write signal inputs.

The set signal SET is generated at the beginning of processing of each column data.

Each of latch circuits 155-1 through 155-4 receives the set signal SET from the controller 154, and receives 8-bit data of a predetermined constant value, in addition to the 8-bit bitmap data and the latch signals Latch0 through Latch3. The latch circuits 155-1 through 155-4 latch the 8-bit data of the predetermined constant value instead of latching the 8-bit bitmap data when the set signal SET is applied thereto.

As can be seen from the above, the set signal SET is used for setting the predetermined constant data for the latches. Imagine a case in which data to be printed includes areas such as a frame line or an area filled with black. In this case, data 0x01 for printing one dot can be used for printing a frame line, or data 0xff for printing all dots can be used for printing an area filled with black. When such data is set in the latches by the set signal SET, there is no need to provide the input data to the latches each time.

FIGS. 16A through 16I are time charts showing signal patterns of the row-order-conversion unit according to the second variation of the first embodiment.

As shown in FIGS. 16A through 16E, after the predetermined constant values are set for the latch circuits 155-1 through 155-4 by the set signal SET, the bitmap data A and B is written in the latch circuits 155-1 and 155-4 corresponding to the addresses 0 and 3, respectively. As a result, the latch circuits 155-2 and 155-3 hold the predetermined constant value, and the latch circuits 155-1 and 155-4 hold the data A and B. The row-order conversion process is applied while the latch circuits 155-2 and 155-3 hold the predetermined constant value.

When the data is read from the addresses 0 through 3, the data a, b, c, and d is obtained in this order.

Figure 17A:
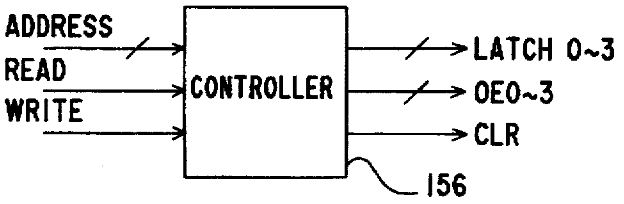
FIGS. 17A and 17B are block diagrams of a row-order-conversion unit according to a third variation of the first embodiment.
Figure 17B:
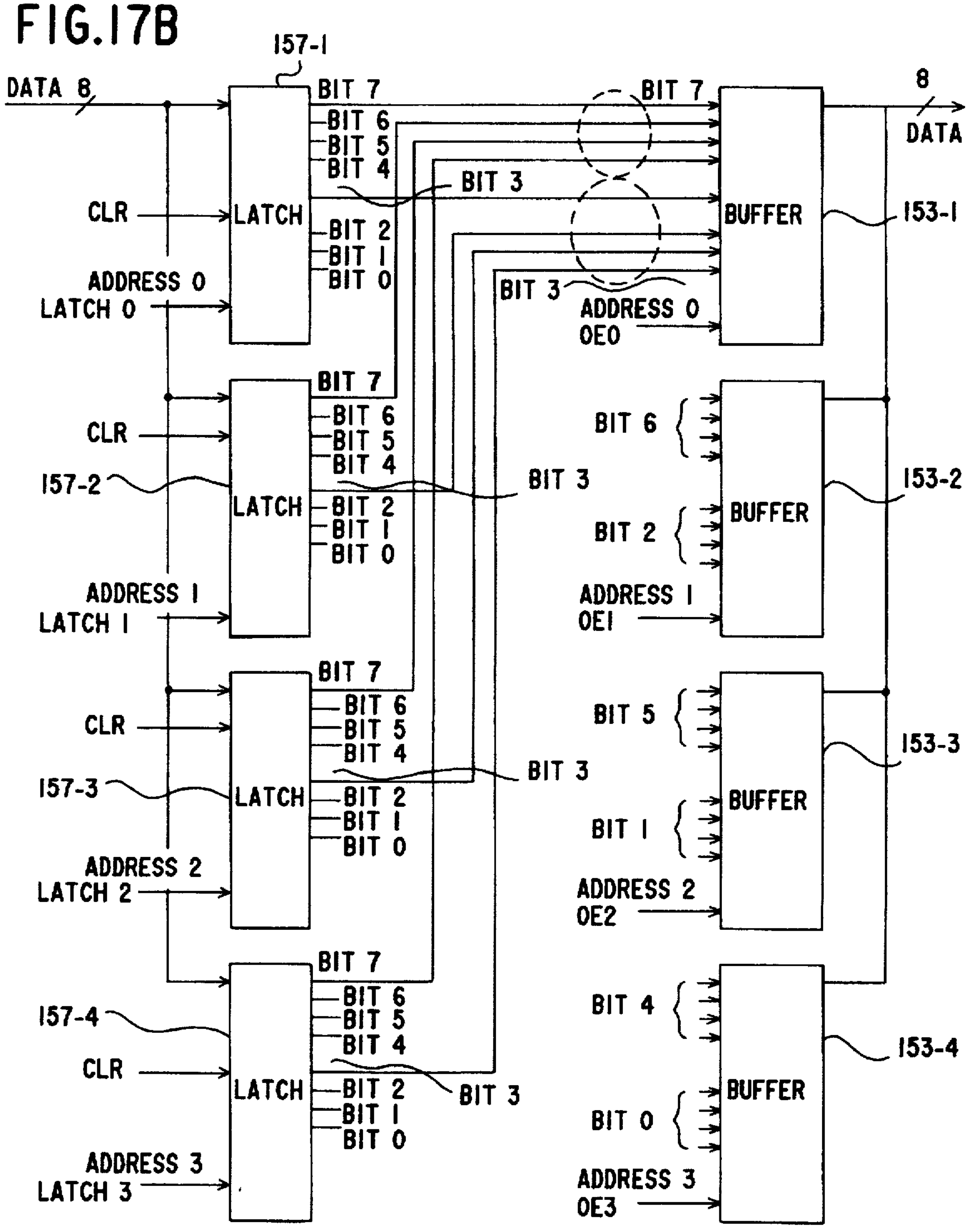
Figures 18A, 18B, 18C, 18D, 18E, 18F, 18G, 18H, 18I:
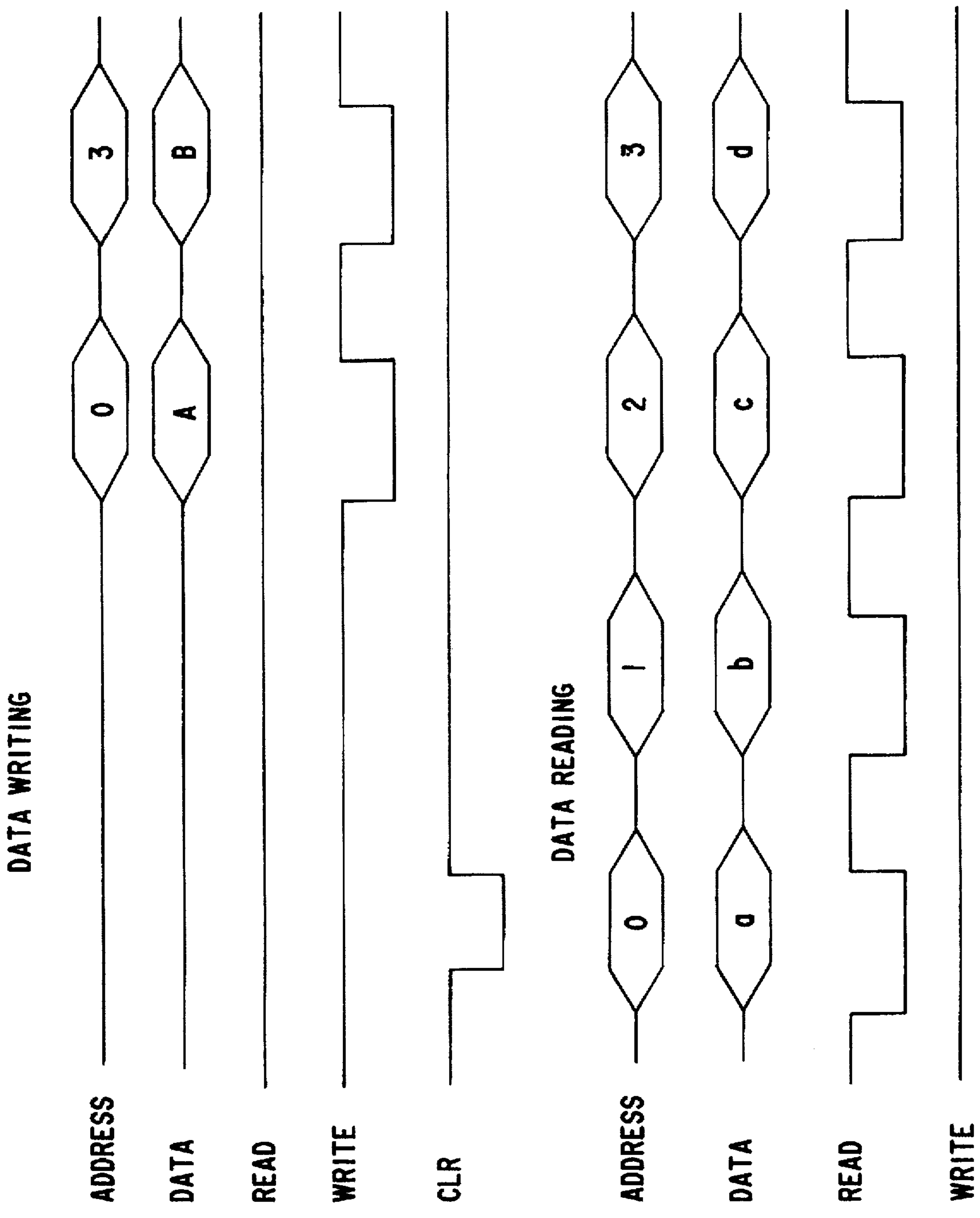
FIGS. 18A through 18I are time charts showing signal patterns of the row-order-conversion unit according to the third variation.

FIGS. 17A and 17B are block diagrams of a row-order-conversion unit according to a third variation of the first embodiment. In FIGS. 17A and 17B, the same elements as those of FIGS. 15A and 15B are referred to by the same numerals, and a description thereof will be omitted.

In the third variation, a clear signal CLR replaces the set signal SET of the second variation, in which the clear signal CLR is used for setting zero for the latches.

The controller 156 generates the clear signal CLR.

Each of latch circuits 157-1 through 157-4 receives the clear signal CLR from the controller 156 in addition to the bitmap data and the latch signals Latch0 through Latch3. The clear signal CLR resets the latch circuits 157-1 through 157-4 so as to set zero for the latches.

FIGS. 18A through 18I are time charts showing signal patterns of the row-order-conversion unit according to the third variation of the first embodiment.

As shown in FIGS. 18A through 18E, when data corresponding to the addresses 1 and 2 are null, the data A and B is written in the addresses 0 and 3, respectively, after the latch circuits 157-1 through 157-4 are reset by the clear signal CLR. As shown in FIGS. 18F through 18I, when the data is read from the addresses 0 through 3, the data a, b, c, and d is obtained in this order. Thus, the writing of the data only in the addresses 0 and 3 enables the correct data to be converted and read from the addresses 0 through 3.

Since the printed area includes a lot of space areas, setting zero for the latches by using the clear signal CLR enables the printing of the space areas without inputting null-data for each of the space areas.

Figure 19:
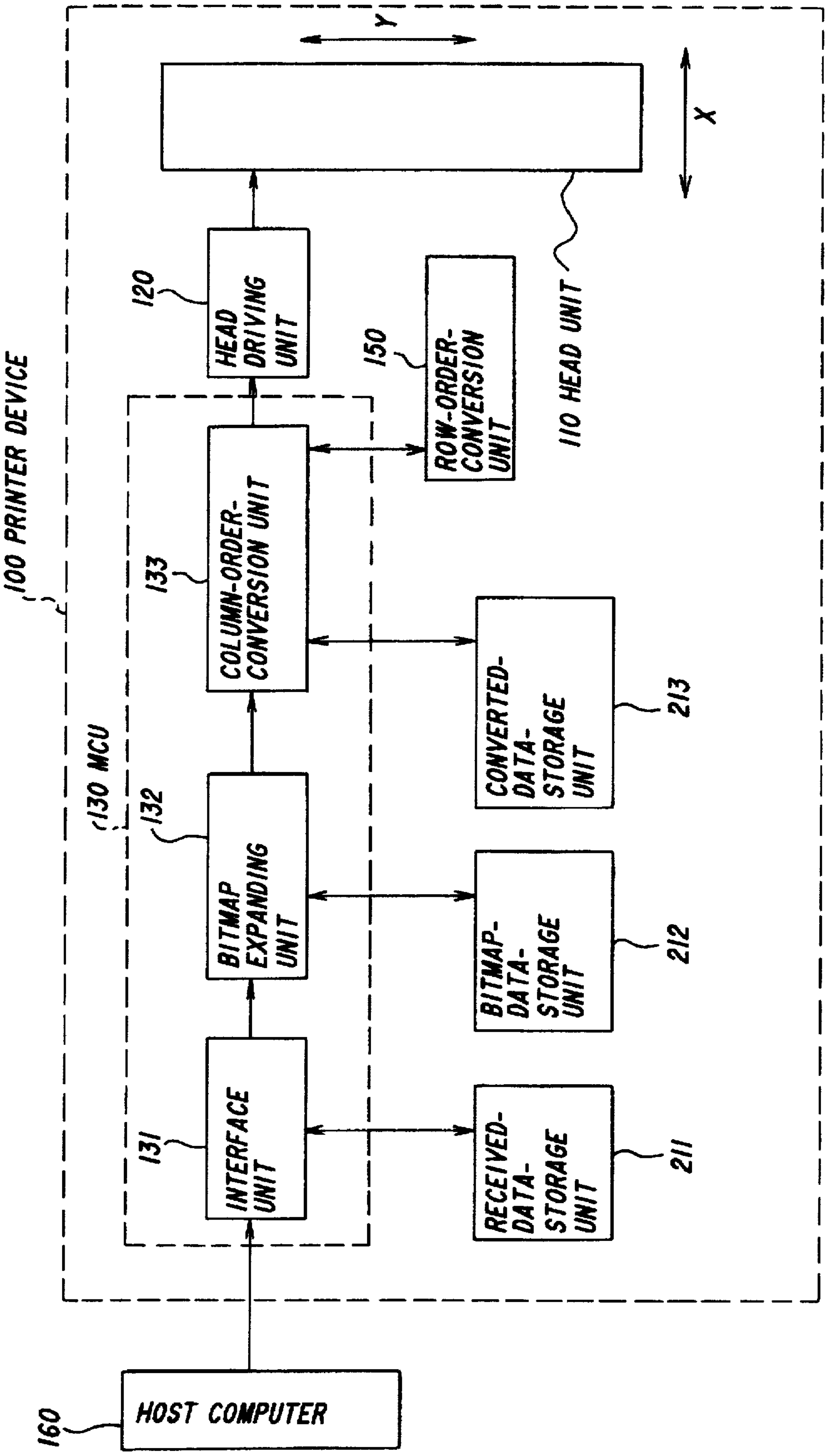
FIG. 19 is a block diagram of a printer device according to a second embodiment.

FIG. 19 is a block diagram of a printer device according to a second embodiment. In FIG. 19, the same elements as those in FIG. 4 are referred to by the same numerals, and a description thereof will be omitted.

In the second embodiment, the data-storage unit 140 of the first embodiment shown in FIG. 4 is replaced by a received-data-storage unit 211, a bitmap-data-storage unit 212, and a converted-data-storage unit 213. These storage units 211 through 213 are structured by separate memory units such as a DRAM.

The interface unit 131 stores the data supplied from the host computer 160 in the received-data-storage unit 211. Further, the interface unit 131 reads the data from the received-data-storage unit 211 to supply it to the bitmap expanding unit 132.

The bitmap expanding unit 132 expands the data supplied from the interface unit 131 into the bitmap data, and stores the bitmap data in the bitmap-data-storage unit 212. Further, the bitmap expanding unit 132 reads the bitmap data from the bitmap-data-storage unit 212 to supply it to the column-order-conversion unit 133.

The column-order-conversion unit 133 sends the bitmap data supplied from the bitmap expanding unit 132 to the row-order-conversion unit 150, where the row conversion process is carried out. Then, the column-order-conversion unit 133 carries out the column conversion process to store the converted data in the converted-data-storage unit 213. At the time of printing, the column-order-conversion unit 133 reads the converted data from the converted-data-storage unit 213, and sends it to the head driving unit 120.

In the second embodiment, the received-data-storage unit 211, the bitmap-data-storage unit 212, and the converted-data-storage unit 213 are made of separate memory units, so that the overhead of the data-storage processing is reduced to enhance the processing speed.

According to the present invention, the row-order-conversion process rearranges the row positions of the bitmap data, and the column-order-conversion process rearranges the column positions of the row-order-converted bitmap data so as to take into account the displacements of the head lines which are arranged diagonally with respect to the scanning direction. In detail, in the row-order-conversion process, the rows of the bitmap data are rearranged to form groups, each of which includes dots to be printed by corresponding print elements in the same column position. Then, in the column-order-conversion process, each group is written in the converted-data storage by shifting a writing address by an amount corresponding to the column interval of the head lines. Thus, the converted bitmap data which can be printed by the diagonally arranged head lines to produce a normal printout is obtained.

Also, according to the present invention, the initial print data is received, stored, and expanded into the bitmap data before the bitmap data is converted to the converted bitmap data. Thus, the conversion process can be carried out efficiently.

Also, according to the present invention, each process can be carried out in a sequence, so that the processing of data can be conducted during the shift of a print sheet. Thus, the conversion process is efficient.

Also, according to the present invention, each process can be carried out simultaneously through a pipeline operation so as to enhance the processing speed.

Also, according to the present invention, when given data is the same as an immediately preceding data, the given data is not overwritten in the memory (latches). Thus, the number of accesses to the data is reduced to boost the processing speed.

Also, according to the present invention, data having a predetermined value is written in the memory (latches) when there is no incoming data. Thus, the number of accesses to the data is reduced when the same print pattern continues to be printed, thereby enhancing the processing speed.

Also, according to the present invention, a predetermined data pattern for a space area is written in the memory (latches) in order to eliminate a need for data access to space areas. Thus, the processing speed is enhanced.

Further, the present invention is not limited to these embodiments, but various variations and modifications may be made without departing from the scope of the present invention.

What is claimed is:

1. A device for printing print data after converting said print data into converted print data, said device comprising:

head means for printing said converted print data by moving in a scanning direction, said head means having at least one head line in which print elements are arranged diagonally with respect to said scanning direction;

row-order-conversion means for rearranging rows of said print data according to an arrangement of said print elements so as to generate row-converted print data; and column-order-conversion means for rearranging column positions of said row-converted print data according to said arrangement of said print elements so as to generate said converted print data.

2. The device as claimed in claim 1, wherein said row-order-conversion means comprises means for rearranging said rows of said print data to form groups of said rows, each of which groups includes data to be printed by said print elements arranged in the same column position in said scanning direction, and said column-order-conversion means comprises means for rearranging said column positions of said row-converted print data by shifting a data position of each of said groups by an amount corresponding to a displacement of said print elements in said scanning direction.

3. The device as claimed in claim 2, wherein said row-order-conversion means rearranges said rows of said print data for one column in one scanning line at one time.

4. The device as claimed in claim 2, further comprising memory means for storing said converted print data, wherein said column-order-conversion means comprises means for storing said row-converted print data in said memory means while shifting a writing address of each of said groups so as to rearrange said column positions of said row-converted print data.

5. The device as claimed in claim 1, further comprising:

receiving means for receiving said print data;

means for storing said print data;

expanding means for expanding said print data into bitmap data corresponding to pixel patterns to be printed; and means for storing said bitmap data, wherein said row-order-conversion means uses said bitmap data to generate said row-converted print data.

6. The device as claimed in claim 5, wherein said receiving means, said expanding means, said row-order-conversion means, and said column-order conversion means operate in sequence to generate one scan line of said converted print data before starting to process a next scan line of said converted print data.

7. The device as claimed in claim 5, wherein said receiving means, said expanding means, said row-orderconversion means, and said column-order conversion means operate simultaneously as a pipeline for processing said print data so as to generate one scan line of said converted print data while processing a next scan line of said converted print data.

8. The device as claimed in claim 1, wherein said row-order-conversion means comprises latch means for latching said print data, said latch means operating in the absence of an input of some of said print data when said print data is compared to immediately preceding print data stored in said latch means by said column-order-conversion means and some of said print data is found to be the same as a corresponding portion of some of said immediately preceding print data stored in said latch means by said column-order-conversion means.

9. The device as claimed in claim 1, wherein said row-order-conversion means comprises latch means for latching said print data, said latch means being set to a predetermined constant value when said latch means operates in the absence of an input of said print data.

10. The device as claimed in claim 1, wherein said row-order-conversion means comprises latch means for latching said print data, said latch means being set to data to be printed as space when said latch means operates in the absence of an input of said print data.

11. The device as claimed in claim 1, wherein said row-order-conversion means rearranges said rows of said print data for one column in one scanning line at one time.

12. A method of converting print data into converted print data to print said converted print data by using a head unit having at least one head line in which print elements are arranged diagonally with respect to a scanning direction of said head unit, said method comprising the steps of:

a) rearranging rows of said print data according to an arrangement of said print elements so as to generate row-converted print data; and b) rearranging column positions of said row-converted print data according to said arrangement of said print elements so as to generate said converted print data.

13. The method as claimed in claim 12, wherein said step a) rearranges said rows of said print data to form groups of said rows, each of which groups includes data to be printed by said print elements arranged in the same column position in said scanning direction, and said step b) rearranges said column positions of said row-converted print data by storing said row-converted print data in a memory while shifting a writing address of each of said groups by an amount corresponding to a displacement of said print elements in said scanning direction.

14. The method as claimed in claim 13, wherein said step a) rearranges said rows of said print data for one column in one scanning line at one time.

15. The method as claimed in claim 12, further comprising, before said step a), the steps of:

c) receiving said print data; and d) expanding said print data into bitmap data corresponding to pixel patterns to be printed, wherein said step a) generates said row-converted print data by using said bitmap data.

16. The method as claimed in claim 15, wherein said steps c), d), a), and b) are performed in sequence to generate one scan line of said converted print data before starting to process a next scan line of said converted print data.

17. The method as claimed in claim 15, wherein said steps c), d), a), and b) are performed simultaneously as a pipeline for processing said print data so as to generate one scan line of said converted print data while processing a next scan line of said converted print data.

18. The method as claimed in claim 12, wherein said step a) rearranges said rows of said print data for one column in one scanning line at one time.

19. A device for converting print data into converted print data for a subsequent application to a print head having at least one head line in which print elements are arranged diagonally with respect to a scanning direction of said head, said device comprising:

row-order-conversion means for rearranging rows of said print data according to an arrangement of said print elements so as to generate row-converted print data;

column-order-conversion means for rearranging column positions of said row-converted print data according to said arrangement of said print elements so as to generate said converted print data; and output means for outputting said converted print data.

* * * * *